US007684436B2

(12) United States Patent
Nakayama et al.

(10) Patent No.: US 7,684,436 B2
(45) Date of Patent: Mar. 23, 2010

(54) GATEWAY APPARATUS, AND METHOD FOR PROCESSING SIGNALS IN THE GATEWAY APPARATUS

(75) Inventors: Makoto Nakayama, Kanagawa (JP);
Yasuhiko Kokubun, Saitama (JP);
Masayuki Nakanishi, Tokyo (JP);
Wataru Takita, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 1012 days.

(21) Appl. No.: 10/518,409

(22) PCT Filed: Jun. 18, 2003

(86) PCT No.: PCT/JP03/07711

§ 371 (c)(1),
(2), (4) Date: Dec. 17, 2004

(87) PCT Pub. No.: WO03/107611

PCT Pub. Date: Dec. 24, 2003

(65) Prior Publication Data

US 2005/0226250 A1    Oct. 13, 2005

(30) Foreign Application Priority Data

Jun. 18, 2002  (JP) .............................. 2002-177405

(51) Int. Cl.
*H04J 3/22* (2006.01)
(52) U.S. Cl. ........................ 370/466; 370/401; 370/467
(58) Field of Classification Search .................. 370/401, 370/466, 467
See application file for complete search history.

(56) References Cited

U.S. PATENT DOCUMENTS

| 6,167,450 | A  | * | 12/2000 | Angwin et al. ............... 709/227 |
| 6,208,653 | B1 | * | 3/2001 | Ogawa et al. .......... 370/395.52 |
| 6,571,100 | B1 |   | 5/2003 | Lautenschlager |
| 6,898,640 | B1 | * | 5/2005 | Kurita et al. ................. 709/238 |
| 6,934,285 | B1 | * | 8/2005 | Ala-Luukko et al. ........ 370/384 |
| 7,120,930 | B2 | * | 10/2006 | Maufer et al. ................. 726/11 |

FOREIGN PATENT DOCUMENTS

| EP | 1 059 777 A1 | 12/2000 |
| JP | 11-032058 | 2/1999 |
| JP | 11-205370 | 7/1999 |

(Continued)

*Primary Examiner*—Jason E Mattis
(74) *Attorney, Agent, or Firm*—Oblon, Spivak, McClelland, Maier & Neustadt, L.L.P.

(57) ABSTRACT

Various services for a mobile communication network or an IP network are implemented by processing necessary information suitably in accordance with a service type so as to exchange the information to a service control device and transmitting the results of the service process by the service control device to the mobile communication network or the IP network, for a service request from the mobile communication network or the IP network. A gateway device of the present invention retains a signal defining various rules or policies received from the service control device, judges a service type and a destination requested from the service request signal by the various rules or policies for the service request signal transmitted from a communication terminal of the mobile communication network or the communication terminal of the IP network, performs protocol conversion on the service request signal in accordance with the service type, and transmits the service request signal to the corresponding destination.

5 Claims, 25 Drawing Sheets

FOREIGN PATENT DOCUMENTS

| | | |
|---|---|---|
| JP | 2000-078192 | 3/2000 |
| JP | 2000-299731 | 10/2000 |
| JP | 2001-069176 | 3/2001 |
| JP | 2001-159891 | 6/2001 |
| JP | 2001-168902 | 6/2001 |
| JP | 2001-292251 | 10/2001 |
| WO | 00/41364 | 7/2000 |

* cited by examiner

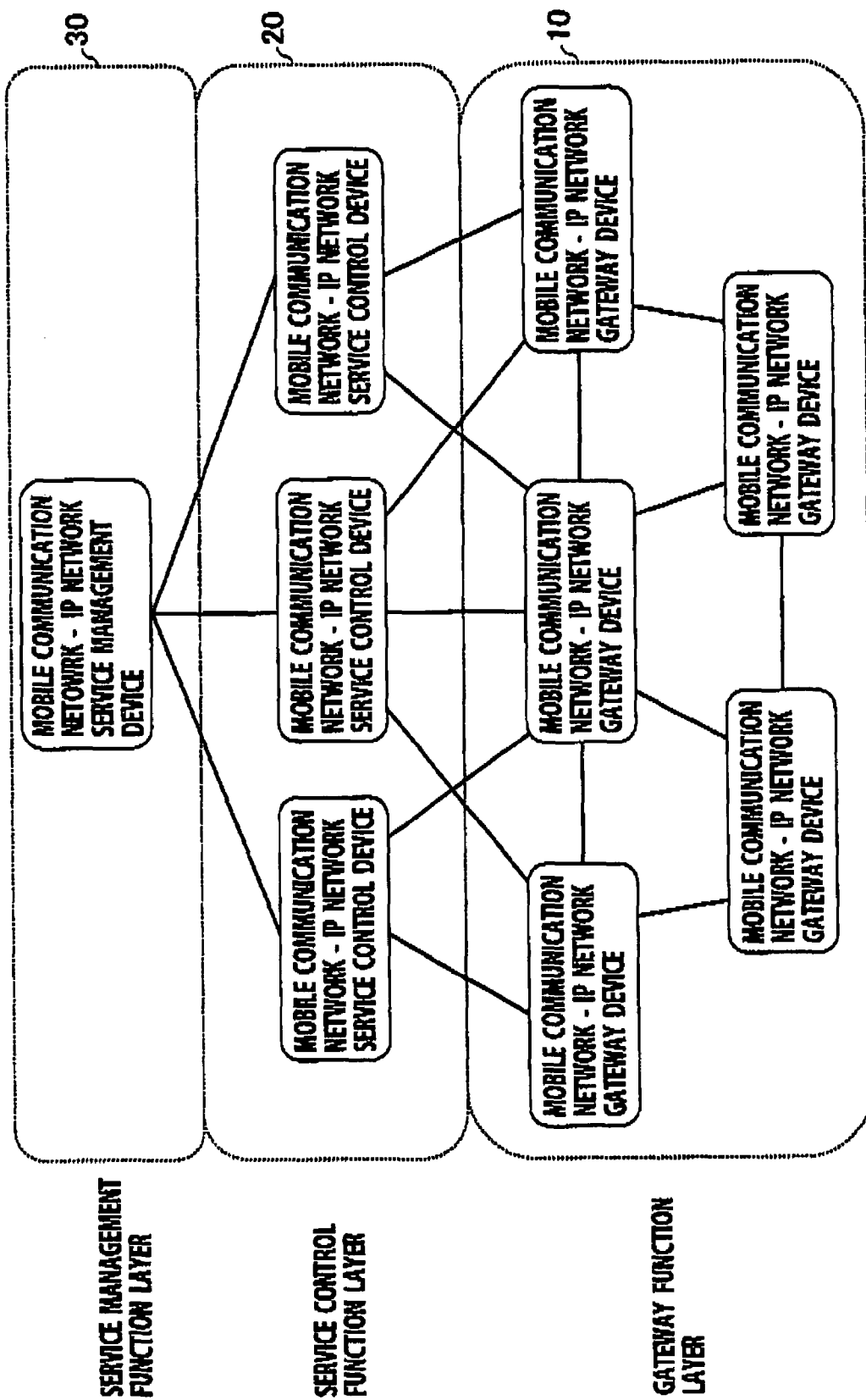

FIG. 15

| MOBILE COMMUNICATION NETWORK ORIGINAL HEADER | IP NETWORK ORIGINAL HEADER | USAGE |
|---|---|---|
| X-1 | X-A | SUBJECT OF MAIL (SUBJECT) |
| X-2 | X-B | TIME WHEN MAIL OR MESSAGE ARRIVED AT SERVER |
| X-3 | X-C | SOURCE MAIL ADDRESS |
| X-4 | X-D | DESTINATION MAIL ADDRESS |
| X-5 | X-E | SIMULTANEOUS RECEIPT ADDRESS |

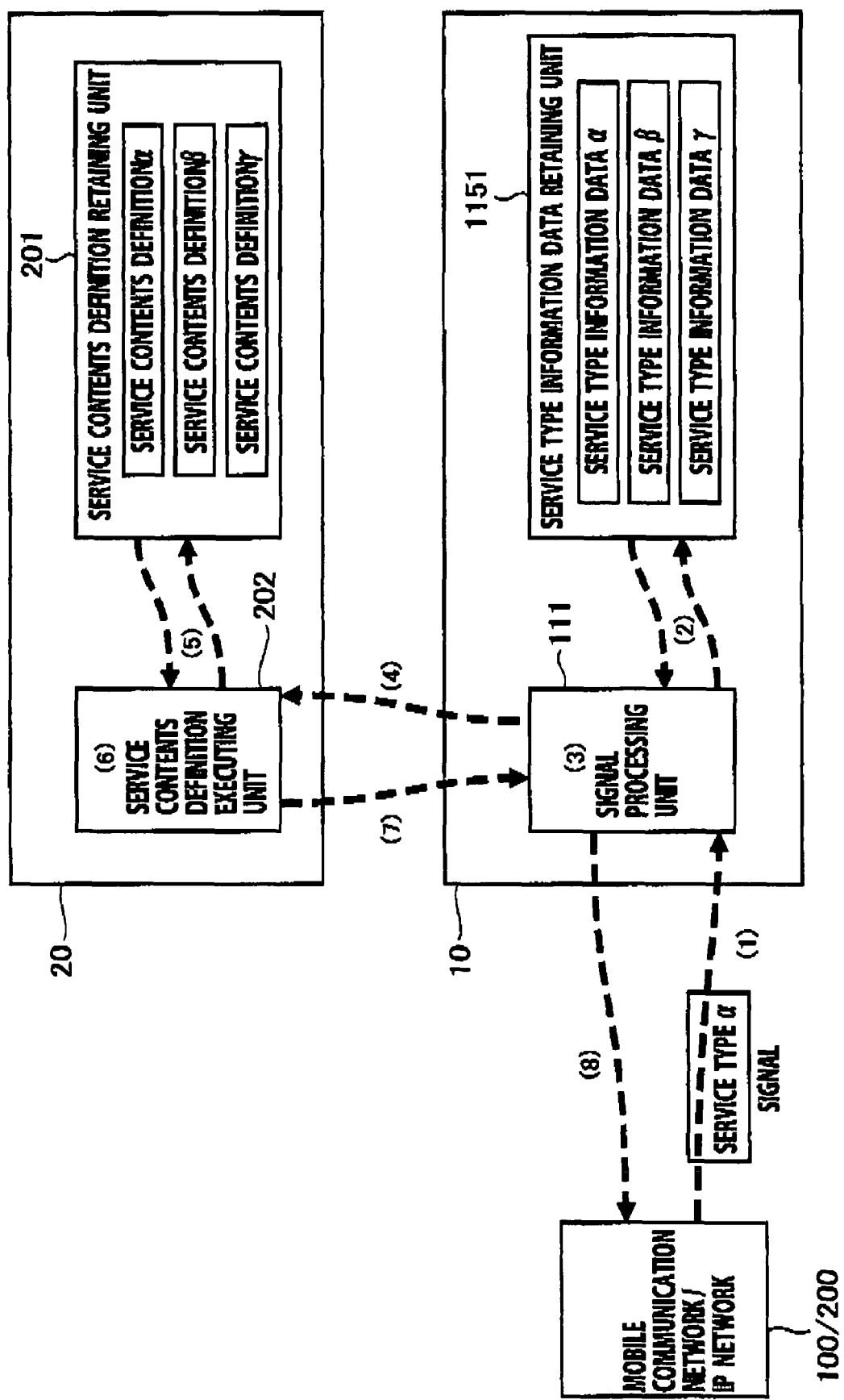

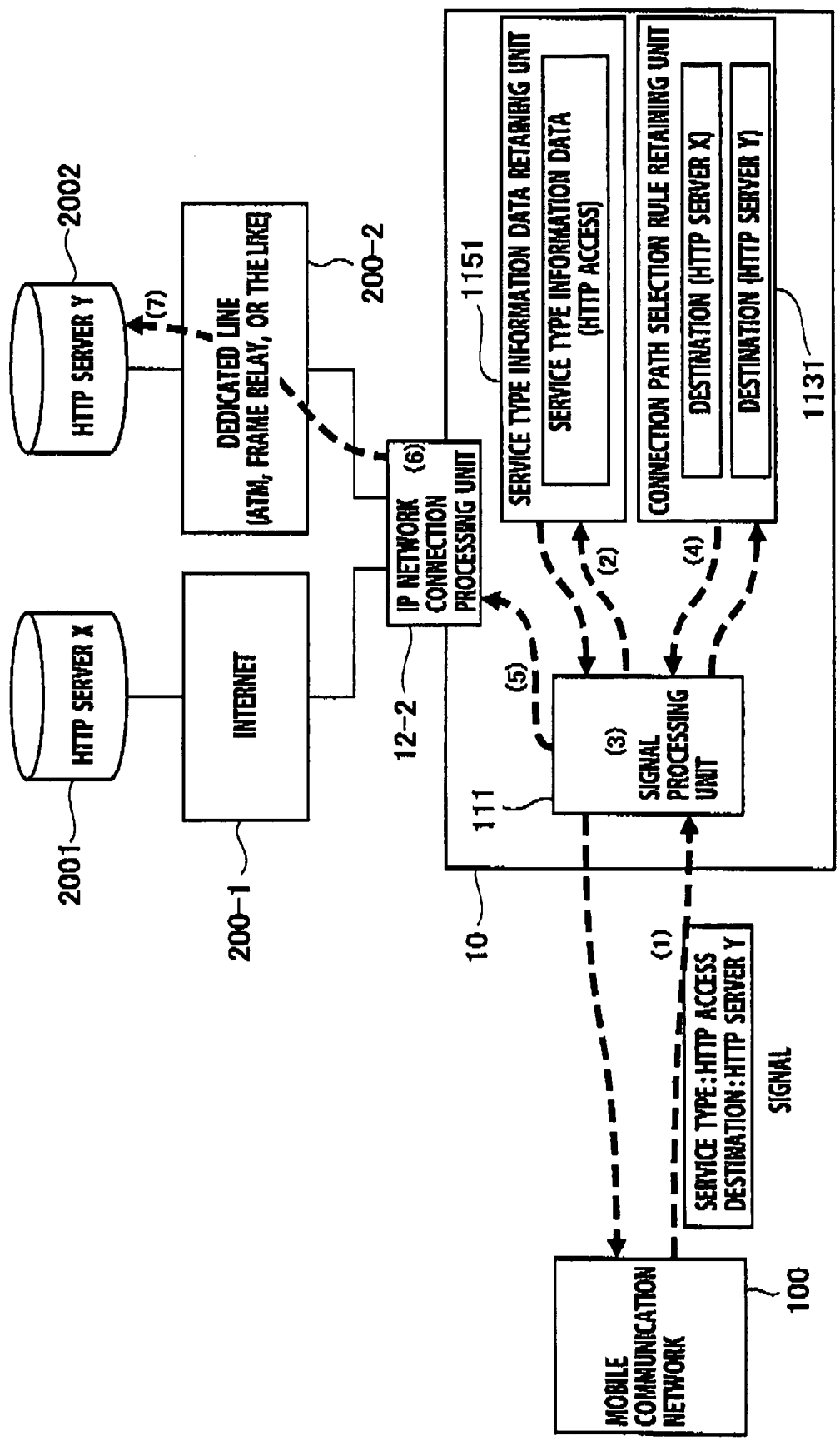

GATEWAY APPARATUS, AND METHOD FOR PROCESSING SIGNALS IN THE GATEWAY APPARATUS

TECHNICAL FIELD

The present invention relates to a gateway device and a method of processing a signal in the gateway device.

BACKGROUND ART

At present, in mobile communication, not only voice communication service, but also packet service including Mail and Push, which utilizes mobile communication network functions, are provided for a communication terminal such as a mobile phone in a mobile communication network and a predetermined communication device such as a PDA having communication functions. Moreover, in conventional mobile communication, Web access service is provided for the communication terminal or the predetermined communication device in the mobile communication network through a specific device in the mobile communication network.

Meanwhile, a gateway device has been proposed to connect two different networks. Gateway devices having a protocol conversion function between different networks, an automatic routing function, a screening function, and a relay function for a Push-type service are known. These conventional examples are disclosed in Japanese Patent Application Laid-open No. 11-205370, Japanese Patent Application Laid-open No. 2000-78192, Japanese Patent Application Laid-open No. 2001-69176, Japanese Patent Application Laid-open No. 11-32058, Japanese Patent Application Laid-open No. 2001-159891, and Japanese Patent Application Laid-open No. 2001-168902.

However, the conventional gateway device only performs protocol conversion in a TCP layer as a gateway device to the mobile communication network, and relays packets between the mobile communication network and an IP network. Accordingly, it is necessary to change service in the mobile communication network after passing the gateway device. Thus, it has been impossible to perform processes for changing service in the gateway device.

Moreover, in the conventional mobile communication, service providing devices such as a location information providing device and a charging device are provided for each service. Hence, it has been necessary to change the devices individually upon a service change. Furthermore, information necessary for each service providing device is processed in each service providing device to provide service. Thus, it has been impossible to manage various services integrally.

In addition, the service providing device of the conventional mobile communication network provides service to only a communication terminal or the predetermined communication device of the mobile communication network. Therefore, it has been impossible to utilize functions of the various services in the mobile communication network from a communication terminal or a predetermined communication device of the IP network.

DISCLOSURE OF THE INVENTION

Thereupon, the present invention has been devised in consideration of the above. An object of the present invention is to provide a gateway technique which can (1) change the functions of the gateway suitably by a function change command from a service management device, (2) process information necessary for service control device suitably in accordance with a service type, (3) perform protocol conversion in an application layer corresponding to a service type suitably for each service, or (4) provide an application interface to utilize various services for the mobile communication network from an external network, for a gateway device which is connected between the mobile communication network and an external network, for example, an IP network, and relays a service request signal sent from a communication terminal or a predetermined communication device.

In order to achieve the aforementioned goals, the first aspect of the present invention is a gateway device connected to a mobile communication network, an external network, and a service control device which executes service control based on signals received from a communication terminal or a predetermined communication device, so as to transmit and receive signals to and from the service control device, which is summarized by including a receiver configured to receive control information required for providing service, from the service control device; and an information processor configured to perform a predetermined information process based on the control information for a signal received from the mobile communication network or the external network.

In the first aspect of the present invention, the information processor may include a gateway rule retainer and a gateway rule executor. The gateway rule retainer may be configured to retain a gateway rule given through the service control device. The gateway rule executor may be configured to execute a gateway process by applying the gateway rule to signals, which are received from the service control device, the mobile communication network, the external network, and the communication terminal or the predetermined communication device contained in the mobile communication network or the external network.

In addition, in the first aspect of the present invention, the gateway rule includes protocol conversion information on protocol conversions which should be executed in the gateway rules when packet signals are transferred among the service control device, the mobile communication network, and the external network; information extraction information on information which should be acquired in the gateway device from the packet signals transmitted from the service control device, the mobile communication device, or the external network; packet allocation information on packet allocation performed in the gateway device to a connection processor containing a network and the communication terminal or the communication device for the packet signals transmitted from the service control device, the mobile communication network, or the external network; and information accumulation information on a packet signal which should be accumulated in the gateway device among the packet signals transmitted from the service control device, the mobile communication network, or the external network. The gateway rule executor may be configured to execute a protocol conversion process in accordance with the protocol conversion information defined by the gateway rule, an information extraction process in accordance with the information extraction information, a packet allocation process to the connection processor in accordance with the packet allocation information, or an accumulation process of the packet signals in accordance with the information accumulation information, for the packet signals received from the service control device, the mobile communication network, the external network, or the communication terminal or the predetermined communication device contained in the mobile communication network or the external network.

Moreover, in the first aspect of the present invention, the information processor may include a connection path selection rule retainer and a connection path selection rule executor. The connection path selection rule retainer may be configured to retain a connection path selection rule given through the service control device. The connection path selection rule executor may be configured to apply the connection path selection rule to the signal received from the mobile communication network, the external network, or the service control device, so as to determine a destination of the signal and to transfer the signal to the destination.

Furthermore, in the first aspect of the present invention, the connection path selection rule may include service type information on service prepared by the service control device or an external network contents and service provider; source information of packet signals of a service control device, a mobile communication network, an external network, or a communication terminal or a predetermined communication device contained in the mobile communication network or the external network, which are expected in advance to transmit the packet signals; and destination information of the packet signals which are expected in advance to designate as the destination of the packet signals by the network or the device. The connection path selection rule executor may be configured to identify the source information, the destination information, and the service type information of the packet signals, to judge the destination of the packet signals by applying the information described on the connection path selection rule, and to transfer the packet signals to the corresponding destination, when receiving the packet signals transmitted from the service control device, the mobile communication network, the external network, or the communication terminal or the predetermined communication device contained in the mobile communication network or the external network.

Still furthermore, in the first aspect of the present invention, the information processor may include a screening policy retainer and a screening policy executor. The screening policy retainer can be configured to retain a screening policy sent through the service control device. The screening policy executer can be configured to apply the screening policy to the packet signals received from the mobile communication network, the external network, or the communication terminal or the predetermined communication device contained in the mobile communication network or the external network, so as to judge the correctness of the signals and to discard an inappropriate packet signal.

Yet furthermore, in the first aspect of the present invention, the screening policy can include information indicating a protocol type which allows transfer of the packet signals, a port number, and a direction the packet signals flow, in the gateway device; information for judging the correctness of an original protocol defined to mutually connect the service control device, the mobile communication network, and the external network; and information indicating a limit of packet process capabilities of the service control device and the gateway device. The screening policy executor can be configured to execute a process for judging the protocol type and the port number of the packet signal and the direction the packet signals flow and for additionally judging the correctness of the original protocol when the packet signal is transmitted on the original protocol; a process for transferring packet signals, which are allowed to be transferred by the screening policy, in the gateway device and for discarding packet signals, which are not allowed to be transferred, in the gateway device, or a process for discarding the packet signal in the gateway device to avoid congestion when the packet signals more than the limit of the process capabilities of the service control device or the gateway device defined by the screening policy are transmitted, when receiving the packet signals transmitted from the mobile communication network, the external network, or the communication terminal or the predetermined communication device contained in the mobile communication network or the external network.

Yet furthermore, in the first aspect of the present invention, the information processor may include a signal processor. The signal processor may be configured to perform protocol conversion on the packet signals received from the communication terminal or the predetermined communication device of the mobile communication network into signals usable in the external network for transferring; and to perform protocol conversion on the packet signals received from the communication terminal or the predetermined communication device of the external network into signals usable in the mobile communication network for transferring.

Yet furthermore, in the first aspect of the present invention, the information processor may include a signal processor and a service type information data retainer. The information processor can be configured to retain a plurality of service type information data corresponding to each of the services. The signal processor is configured to execute a predetermined signal process for the signals, based on information described on the service type information data corresponding to service type information included in the signals received from the service control device, the mobile communication network, the external network, or the communication terminal or the predetermined communication device contained in the mobile communication network or the external network.

The second aspect of the present invention is a gateway device connected to a mobile communication network, an external network, and a service control device which executes service based on signals received from a communication terminal or a predetermined communication device, so as to transmit and receive signals to and from the service control device, which is summarized by including a signal converter configured to convert a signal, of which destination is the service control device among signals from the mobile communication network, the external network, or the communication terminal or the predetermined communication device contained in the mobile communication network or the external network, into a signal corresponding to a service type executed in the service control device, so as to transmit the signal to the service control device, to receive control information and service process results processed in the service control device, and to perform inverse conversion of the signal conversion; a signal exchanger configured to exchange signals between the signal converter and the mobile communication network or the external network containing the communication terminal or the predetermined communication device.

In the second aspect of the present invention, the signal exchanger can be configured to define individual service control device interfaces for each of the service types for the service control device, to transfer the signal converted in the signal converter to the service control device through a corresponding service control device interface among the service control device interfaces, to performs, in the signal converter, the inverse conversion on the signal received from the service control device through one of the service control device interfaces, and to transmit the signal to a network, a communication terminal, or a communication device of the service request source.

Moreover, in the second aspect of the present invention, the signal exchanger may include a service type identifier. The service type identifier can be configured to define individual network interfaces for each of the service types which the service control device can provide, to receive a service request signal from the mobile communication network, the external network, the communication terminal or the predetermined communication device contained in the mobile communication network or the external network, to exchange the service request signal to the signal converter through the network interfaces corresponding to the service types, and to transmit a received signal, on which the inverse conversion has been performed in the signal converter, to the network, the communication terminal or the communication device of the service request source through one of the interfaces.

The third aspect of the present invention is a method of processing a signal in a gateway device connected to a mobile communication network, an external network, and a service control device which executes service based on a signal transmitted from a communication terminal or a predetermined communication device, so as to transmit and receive a signal to and from the service control device, which includes a step for receiving and retaining a signal defining various rules or policies distributed from the service control device; a step for judging a service type and a destination requested by a service request signal by the various rules or policies distributed from the service control device for the service request signal received from the mobile communication network or the external network; and a step for performing protocol conversion for the service request signal in accordance with a corresponding service type, and transmitting the service request signal to a corresponding destination.

BRIEF DESCRIPTION OF THE DRAWINGS

FIG. 4 is a configuration diagram of a mesh-type network employing the service providing system according to the first embodiment of the present invention.

FIG. 15 is an explanatory view of an original header of a packet used for mutual communication among the mobile communication network-IP network gateway device and the mobile communication terminal as well as the IP network, in the service providing system according to the first embodiment of the present invention.

FIG. 24 is an explanatory view showing a protocol conversion process and a signal process performed in accordance with a service type by the mobile communication network-IP network gateway device in the service providing system according to the second embodiment of the present invention.

FIG. 25 is an explanatory view showing a protocol conversion process and a signal process performed in accordance with a service type and a destination by the mobile communication network-IP network gateway device in the service providing system according to the second embodiment of the present invention.

BEST MODES FOR CARRYING OUT THE INVENTION

Hereinafter, first and second embodiments of the present invention are detailed based on the drawings. Note that a third generation mobile communication network (IMT-2000 network) and an IP network are described as examples of a mobile communication network and an external network, respectively. Moreover, in the present specification, an IP network contents and service provider indicate a server system which is connected to the external network such as the IP network and distributes contents and services.

First Embodiment

Figure 1:
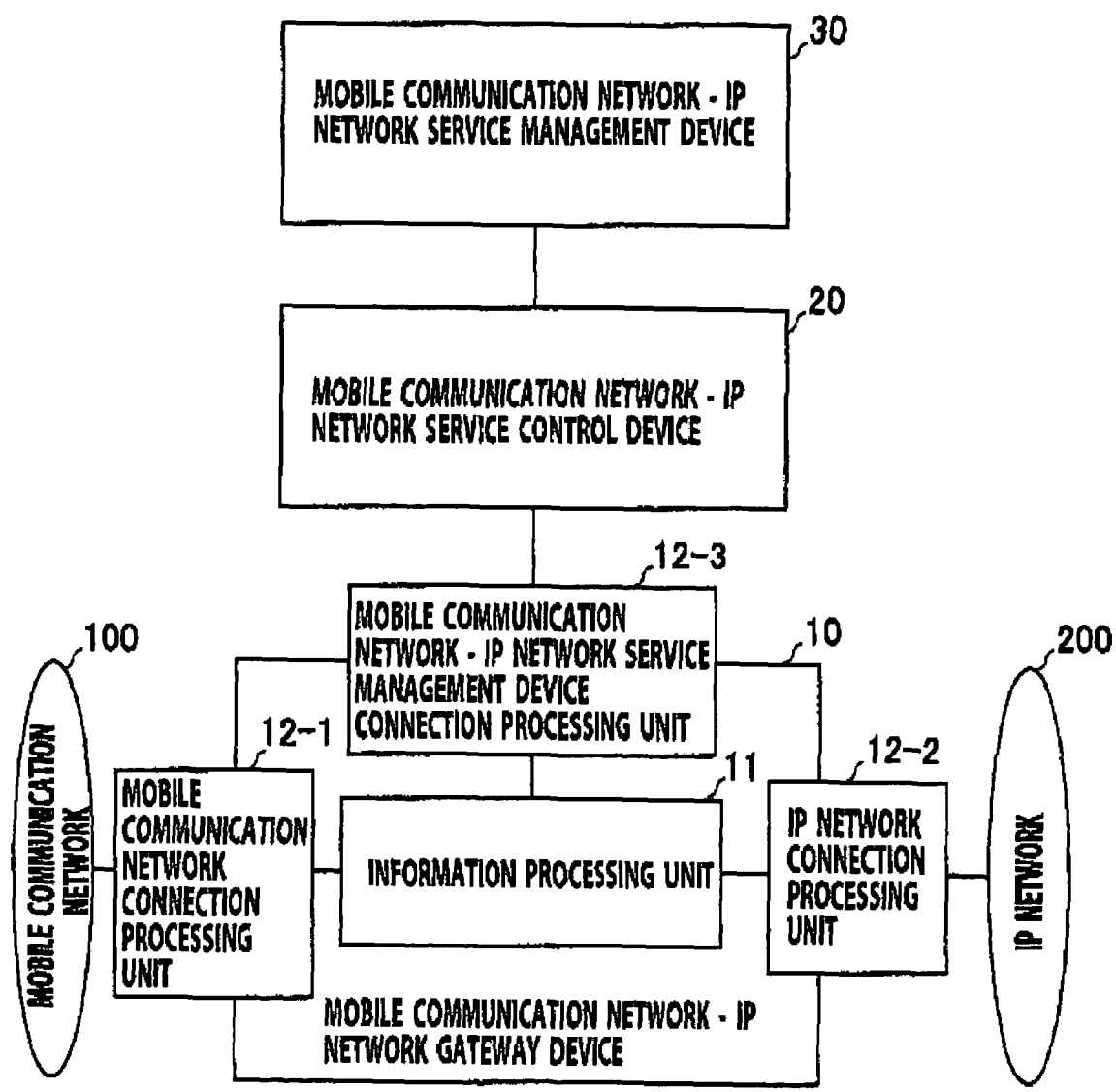
FIG. 1 is a block diagram of a service providing system according to an embodiment of the present invention.
Figure 2:
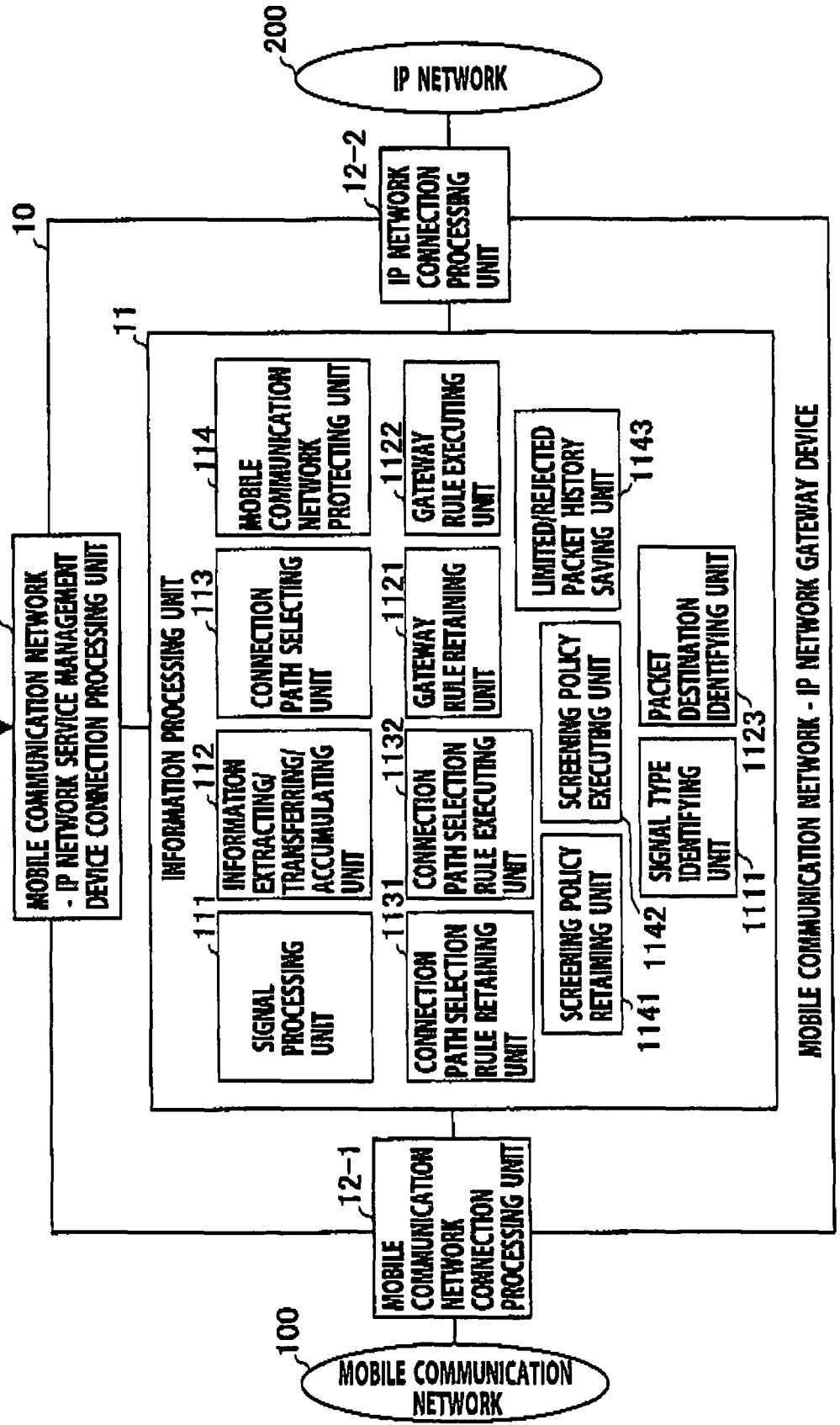
FIG. 2 is a block diagram showing the function configuration of a mobile communication network-IP network gateway device in a service providing system according to a first embodiment of the present invention.
Figure 3:
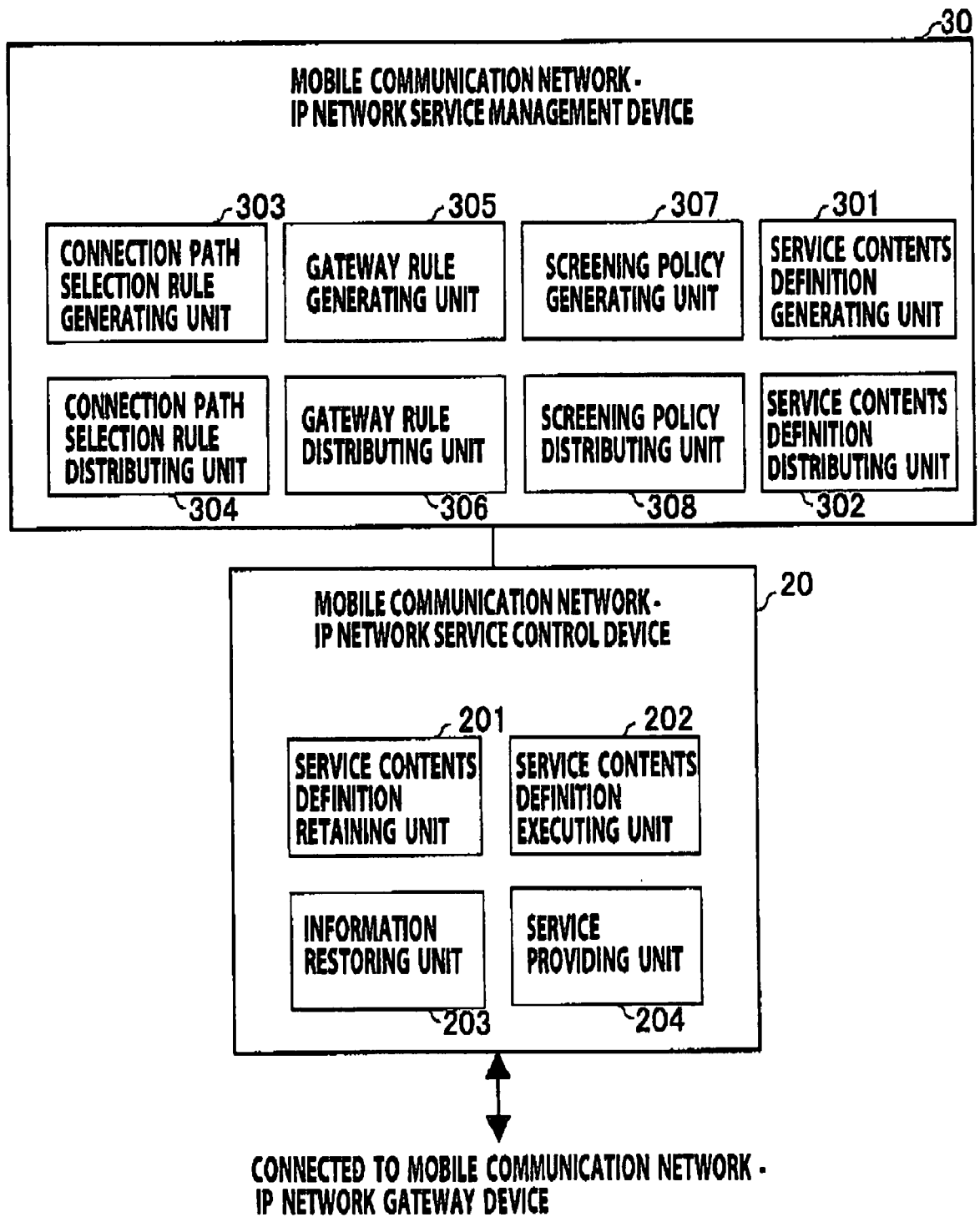
FIG. 3 is a block diagram showing the function configurations of a mobile communication network-IP network service control device and a mobile communication network-IP network service management device in the service providing system according to the first embodiment of the present invention.

A service providing system according to the first embodiment of the present invention shown in FIGS. 1 to 3 is configured by a mobile communication network-IP network gateway device 10, a mobile communication network-IP network service control device 20, and a mobile communication network-IP network service management device 30.

As shown in FIG. 1, in the service providing system according to the present embodiment, the mobile communication network-IP network service control device 20 is connected to serve as an upper layer of the mobile communication network-IP network gateway device 10, and the mobile communication network-IP network service management device 30 is connected to serve as a further upper layer thereof. Thus, the service providing system takes a three-layer configuration as a whole, a gateway function layer, a service control function layer, and a service management function layer from the lower layer.

The mobile communication network-IP network gateway device 10 is connected to the mobile communication network-IP network service control device 20 and the mobile communication network-IP network service management device 30. The mobile communication network-IP network gateway device 10 receives and stores various rules sent from the mobile communication network-IP network service management device 30 through the mobile communication network-IP network service control device 20. The mobile communication network-IP network gateway device 10 follows the various rules to execute the under-mentioned protocol conversion process and other gateway functions (gateway process).

Moreover, the mobile communication network-IP network gateway device 10 has means for containing a mobile communication network 100 and an IP network 200 (a mobile communication network connection processing unit 12-1 and an IP network connection processing unit 12-2). The mobile communication network-IP network gateway device 10 contains the mobile communication network-IP network service control device 20, the mobile communication network 100, and the IP network 200, performs various protocol conversions for IP packets (packet signals) sent from these three, and transfers the IP packets to a predetermined destination.

Note that the mobile communication network-IP network service control device 20, the mobile communication network 100, and the IP network 200 are connected to the mobile communication network-IP network gateway device 10, and they are able to send and receive the IP packets to and from other network as well as a communication terminal and a communication device which are contained in the other network only through this mobile communication network-IP network gateway device 10.

Figure 8:
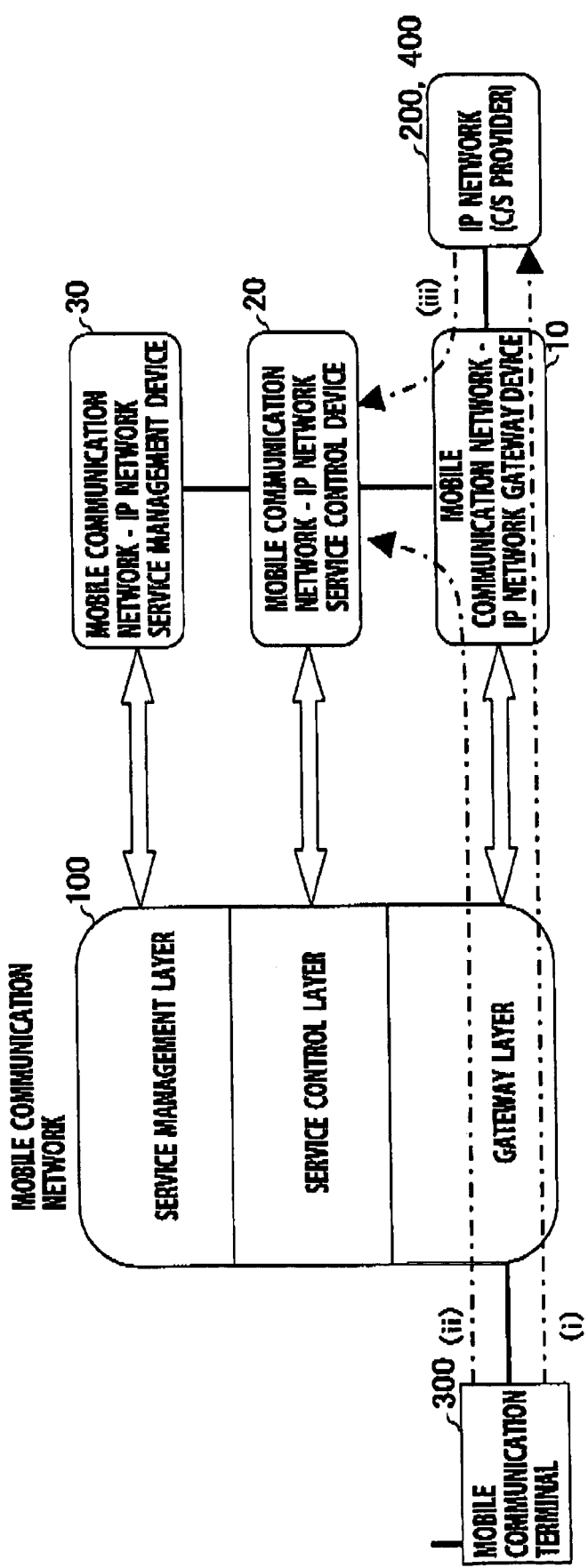
FIG. 8 is an explanatory view showing the communication configurations from the mobile communication terminal as well as the IP network contents and service provider to the service providing system according to the first embodiment of the present invention.

In addition, as shown in FIG. 8, the mobile communication network-IP network gateway device 10 executes a predetermined service providing process corresponding to IP packets sent from a communication terminal or a predetermined communication device (e.g., a mobile communication terminal 300 such as a mobile phone) of the mobile communication network 100 and IP packets sent from a communication terminal or a predetermined communication device (e.g. IP network contents and service provider 400) of the IP network 200, complements the mobile communication network functions, and provides enhanced packet service to the communication terminal or the predetermined communication device of the mobile communication network 100 or the communication terminal or the predetermined communication device of the IP network 200.

The mobile communication network-IP network gateway device 10 in the service providing system according to the present embodiment includes an information processing unit 11 and connection processing units 12-1, 12-2, and 12-3 as shown in FIG. 1.

The information processing unit 11 includes a signal processing unit 111, an information extracting/transferring/accumulating unit 112, a connection path selecting unit 113, a mobile communication network protecting unit 114, and the like.

The connection processing units 12-1, 12-2, and 12-3 are configured to be connected to the mobile communication network 100, the IP network 200, and the mobile communication network-IP network service control device 20, respectively.

All signals which are transmitted in the mobile communication network-IP network gateway device 10 pass through the information processing unit 11. In addition, the signals are transmitted and received to and from each connection destination in the connection processing units 12-1 to 12-3 independently.

The signal processing unit 111 in the information processing unit 11 in the mobile communication network-IP network gateway device 10 converts the IP packets sent from the communication terminal, the predetermined communication device, or the predetermined connection device (not shown) of the mobile communication network 100, into usable signals for the IP network 200.

Moreover, the signal processing unit 111 converts the IP packets sent from the communication terminal or the predetermined communication device of the IP network 200, into the usable signals in the mobile communication network 100.

The signal processing unit 111 includes a signal type identifying unit 1111 for these functions. For example, the signal type identifying unit 1111 differentiates (1) contents signals sent and received to and from a user from (2) control signals for communication control, communication network control, or the like such as communication connection or communication disconnection occurred when the contents signals are transmitted and received, or the like. The signal processing unit 111 performs the signal process corresponding to (1) the contents signals and (2) the control signals identified by the signal type identifying unit 1111, and causes the mobile communication network 100 and the IP network 200 to be mutually connected in respect to the contents signals and control signals.

The information extracting/transferring/accumulating unit 112 in the same information processing unit 11 performs an information extracting process, a transferring process (a packet allocating process), or an information accumulating process, based on the IP packets sent from the communication terminal, the predetermined communication device, or the connection device (not shown) of the mobile communication network 100 and the IP packets sent from the communication terminal or the predetermined communication device of the IP network 200.

Moreover, the information extracting/transferring/accumulating unit 112 functions to perform the information extracting process, the transferring process (the packet allocating process), or the information accumulating process in the upper layer for the received IP packets.

For these functions, the information extracting/transferring/accumulating unit 112 includes a gateway rule retaining unit 1121, a gateway rule executing unit 1122, and a packet destination identifying unit 1123.

The gateway rule retaining unit 1121 is configured to retain gateway rules relating to information extraction, transfer, and accumulation based on the IP packets. Herein, the gateway rules are generated by a gateway rule generating unit 305 of the mobile communication network-IP network service management device 30, and are distributed by a gateway rule distributing unit 306.

Furthermore, the gateway rules include;
(1) definition information (protocol conversion information) on protocol conversion which should be executed in the mobile communication network-IP network gateway device 10 for the IP packet transfer among the mobile communication network-IP network service control device 20, the mobile communication network 100, and the IP network 300;
(2) definition information (information extraction information) on information that should be acquired (extracted) from the IP packets sent from the mobile communication network-IP network service control device 20, the mobile communication network 100, or the IP network 200, in the mobile communication network-IP network gateway device 10;
(3) definition information (packet allocation information) on packet allocation, which is performed in the mobile communication-IP network gateway device 10, to each network and each connection processing unit 12-1 to 12-3 containing the communication terminal or the communication device, for the IP packets sent from the mobile communication network-IP network service control device 20, the mobile communication network 100, or the IP network 200; and
(4) definition information (information accumulation information) on IP packets that should be accumulated in the mobile communication network-IP network gateway device 10, among the IP packets sent from the mobile communication network-IP network service control device 20, the mobile communication network 100, or the IP network 200.

Furthermore, the gateway rule executing unit 1122 is configured to take out the gateway rules retained by the gateway rule retaining unit 1121, and to apply the corresponding gateway rules so as to execute a gateway process. For example, the gateway rule executing unit 1122 is configured to perform an information extraction process, a transferring process (packet allocation process), or an accumulating process based on the IP packets.

Specifically, the processes executed by the gateway rule executing unit 1122 for the IP packets received from the mobile communication network-IP network service control device 20 or the communication terminal or the predetermined communication device 300 or 400 of the mobile communication network 100 or the IP network 200 include:
 a protocol conversion process in accordance with the protocol conversion information defined by the gateway rules;
 an information extracting process in accordance with information extraction information;
 a packet allocating process to each connection processing unit 12-1 to 12-3 in accordance with the packet allocation information; and
 an accumulating process of the packets in accordance with the information accumulation information.

The information extracting/transferring/accumulating unit 112 may be configured to identify a destination of the IP packets sent from the communication terminal or the predetermined communication device of the mobile communication network 100, and a destination of the IP packets sent from the communication terminal or the predetermined communication device of the IP network 200 by the packet destination identifying unit 1123. The information extracting/transferring/accumulating unit 112 may be configured to transfer the IP packets to the any of the destinations, the mobile communication network 100, the IP network 200, the mobile communication network-IP network service control device 20, or the mobile communication network-IP network service management device 30, based on the identification results.

In the case of routing the IP packets sent from the communication terminal or the predetermined communication device of the mobile communication network 100 and the IP packets sent from the communication terminal or the predetermined communication device of the IP network 200, the connection path selecting unit 113 in the same information processing unit 11 performs the routing combining the routing of the mobile communication network 100 and the routing of the IP network 200 between the mobile communication network 100 and the IP network 200.

For this function, the connection path selecting unit 113 includes a connection path selection rule retaining unit 1121 and a connection path selection executing unit 1122.

The connection path selection rule retaining unit 1121 is configured to retain connection path selection rules corresponding to connection path selection. Herein, the connection path selection rules are generated by the connection path selection rule generating unit 303 of the mobile communication network-IP network service management device 30, and distributed by the connection path selection rule distributing unit 305 of the mobile communication network-IP network service management device 30 through the mobile communication network-IP network service control device 20.

Furthermore, the connection path selection rules include:
(1) "service type information" indicating a service type prepared in the mobile communication network-IP network service control device 20 or the contents and service provider 400 of the side of the IP network 200;
(2) "IP packet source information" indicating the mobile communication network-IP network service control device 20, which is expected to send the IP packets, or the communication terminal or the predetermined communication device 300 or 400 contained in the mobile communication network 100 or the IP network 200; and
(3) "IP packet destination information" which is expected to be designated by the mobile communication network-IP network service control device 20, which transmits the IP packets, or the communication terminal or the predetermined communication device 300 or 400 contained in the mobile communication network 100 or the IP network 200.

Moreover, the connection path selection executing unit 1122 is configured to take out the connection path selection rules retained by the connection path selection rule retaining unit 1131, and to execute the connection path selection based on the connection path selection rules.

In other words, the connection path selection executing unit 1122 applies the connection path selection rules to the IP packets received from the mobile communication network 100, the IP network 200, the mobile communication network-IP network service control device 20, the communication terminal or the predetermined communication device 300 or 400 of the mobile communication network 100 or the IP network 200, so as to determine the destination of the IP packets, and to transfer the IP packets to the destination.

Specifically, the process executed by the connection path selection rule executing unit 1132 includes identifying "IP packet source information", "IP packet destination information", and "service type information", which are included in the IP packets upon receipt of the IP packets transmitted from the mobile communication network-IP network service control device 20 as well as the communication terminal or the predetermined communication device 300 or 400 of the mobile communication network 100 or the IP network 200, applying information described in the connection path selection rules so as to determine the destination of the IP packets (e.g., the network 100, 200 or the device 20), and sending the IP packets through the connection processing unit 12-1 to 12-3 corresponding to the destination.

In addition, a mobile communication network protecting unit 114 in the information processing unit 11 is configured to perform the receipt limitation or receipt rejection on the mobile communication network 100 for the IP packets transmitted from the communication terminal or the predetermined communication device of the IP network 200.

For this function, the mobile communication network protecting unit 114 includes a screening policy retaining unit 1141, a screening policy executing unit 1142, and a limited/rejected packet history saving unit 1143.

The screening policy retaining unit 1141 is configured to retain screening policies for performing the receipt limitation or receipt rejection on the IP packets. Herein, the screening policies are generated by a screening policy generating unit 307 of the mobile communication network-IP network service management device 30, and are distributed by a screening policy distributing unit 308 of the mobile communication network-IP network service management device 30.

Moreover, the screening policies include:
(1) information indicating a "protocol type", a "port number", and a "direction packet signals flow", which allow the transfer of the IP packets in the mobile communication network-IP network gateway device 10;
(2) information for judging the correctness of an original protocol defined for mutually connecting the mobile communication network-IP network service control device 20, the mobile communication network 100, and the IP network 200; and
(3) information indicating the limit of the IP packet process capabilities of the mobile communication network-IP network service management device 30, the mobile communication network-IP network service control device 20, and the mobile communication network-IP network gateway device 10.

Meanwhile, the screening policy executing unit 1142 applies the screening policies taken out from the screening policy retaining unit 1141 to the IP packets received from the mobile communication network 100, the IP network 200 or the like, so as to judge the correctness of the packets, and to execute the receipt limitation or the receipt rejection. For example, the screening policy executing unit 1142 discards inappropriate IP packets.

Specifically, the processes executed by the screening policy executing unit 1142 include:
(1) process for identifying the "protocol type", the "port number", and the "direction IP packets flow" of the IP packets based on the IP packets transmitted from the communication terminal or the predetermined communication device 300 or 400 of the mobile communication network 100 or the IP network 200, and further judging the correctness of the original protocol when the IP packets are transmitted on the original protocol;
(2) process for transferring the IP packets, which are allowed to be transferred by the screening policies, in the mobile communication network-IP network gateway device 10, and discarding the IP packets, which are not allowed to be transferred, in the mobile communication network-IP network gateway device 10; and
(3) process for discarding the IP packets in the mobile communication network-IP network gateway device 10 so as to avoid the congestion, when the IP packets more than the limit of the process capabilities of the mobile communication network-IP network service management device 30, the mobile communication network-IP network service control device 20, or the mobile communication network-IP network gateway device 10 are transmitted, in which the limit is defined by the screening policies.

The limited/rejected packet history saving unit 1143 is configured to save the IP packets and the histories thereof, on which the screening policy executing unit 1142 has performed the receipt limitation or the receipt rejection.

From the above functions, as shown in FIG. 8, it is possible for the mobile communication network-IP network gateway device 10 to connect the contents and service provider 400 to the side of the IP network 200 by the connection processing unit 12-2, to select only the IP packets of which destination is the contents and service provider 400 connected by the connection processing unit 12-2 among the IP packets transmitted from the communication terminal or the predetermined communication device 300 of the mobile communication network 100 by the packet destination identifying unit 1123, and to transfer the IP packets to the contents and service provider 400 by the information extracting/transferring/accumulating unit 112.

In addition, by transferring the IP packets transmitted from the contents and service provider 400 to the communication terminal or the predetermined communication device 300 of the mobile communication network 100 designated by the contents and service provider, the mobile communication network-IP network gateway device 10 can provide predetermined contents and services for the contents and service provider 400 in the IP network 200 connected to the mobile communication network 100 and the communication terminal or the predetermined communication device of the mobile communication network 100.

The mobile communication network-IP network service control device in the service providing system according to the present embodiment performs service control corresponding to the IP packets transmitted from the communication terminal or the predetermined communication device of the mobile communication network 100 through the mobile communication network-IP network gateway device 10 and the IP packets transmitted from the communication terminal or the predetermined communication device of the IP network 200 through the mobile communication network-IP network gateway device 10, and sends the control results to a request source through the mobile communication network-IP network gateway device 10.

As shown in FIG. 3, the mobile communication network-IP network service control device 20 includes a service contents definition retaining unit 201, a service contents definition executing unit 202, an information restoring unit 203, and a service providing unit 204.

The service contents definition retaining unit 201 is configured to retain service contents definitions distributed from the mobile communication network-IP network service management device 30. The service contents definition executing unit 202 is configured to execute the service contents definitions retained in the service contents definition retaining unit 201.

The information restoring unit 203 is configured to restore information relating to the upper layer corresponding to the IP packets, in accordance with the information based on the IP packets extracted and transferred by the information extracting/transferring/accumulating unit 112 of the mobile communication network-IP network gateway device 10.

The service providing unit 204 is configured to perform a predetermined service providing process by causing the service contents definition executing unit 202 to perform the execution in accordance with the contents of the information restored by the information restoring unit 203.

The mobile communication network-IP network service management device 30 in the service providing system according to the present embodiment manages the mobile communication network-IP network gateway device 10 and the mobile communication network-IP network service control device 20.

As shown in FIG. 3, the mobile communication network-IP network service management device 30 includes a service contents definition generating unit 301, a service contents definition distributing unit 302, a connection path selection rule generating unit 303, a connection path selection rule distributing unit 304, a gateway rule generating unit 305, a gateway rule distributing unit 306, a screening policy generating unit 307, and a screening policy distributing unit 308.

The service contents definition generating unit 301 is configured to generate the service contents definitions which define the service (process) contents provided in the mobile communication network-IP network service control device 20.

The service contents definition distributing unit 302 is configured to distribute the service contents definitions generated in the service contents definition generating unit 301, to the mobile communication network-IP network service control device 20.

The connection path selection rule generating unit 303 is configured to generate the connection path selection rules corresponding to the connection path selection between the mobile communication network 100 and the IP network 20. The connection path selection rule generating unit 303 can generate new connection path selection rules in accordance with the commands from an external network administrator.

The connection path selection rule distributing unit 304 is configured to distribute the connection path selection rules generated by the connection path selection rule generating unit 303, to the mobile communication network-IP network gateway device 10.

In addition, the gateway rule generating unit 305 is configured to generate the gateway rules relating to the information extraction, transfer, and accumulation based on the IP packets.

The gateway rule distributing unit 306 is configured to distribute the gateway rules generated by the gateway rule generating unit 305, to the mobile communication network-IP network gateway device 10.

Moreover, the screening policy generating unit 307 is configured to generate the screening policies relating to the receipt limitation and the receipt rejection on the IP packets.

The screening policy distributing unit 308 is configured to distribute the screening policies generated by the screening policy generating unit 307, to the mobile communication network-IP network gateway device 10.

FIG. 4 shows a connection conceptual view of the mobile communication network-IP network gateway device 10, the mobile communication network-IP network service control device 20, and the mobile communication network-IP network service management device 30. In practice, as shown in FIG. 4, the plurality of mobile communication network-IP network gateway devices 10 configure a gateway function layer. The plurality of mobile communication network-IP network gateway devices 10 are connected by a mesh-type network configuration. By taking this connection configuration, the gateway function layer achieves load distribution and risk distribution.

Similarly, the plurality of mobile communication network-IP network service control devices 20 configure a service control function layer. Between the gateway function layer and the service control function layer, the mobile communication network-IP network gateway devices 10 and the mobile communication network-IP network service control devices 20 are connected by the mesh-type network configuration. Accordingly, the load distribution and the risk distribution are achieved between the gateway function layer and the service control function layer. Note that the plurality of mobile communication network-IP network service control devices 20 in the service control function layer are connected to a common mobile communication network-IP network service management device 30.

Figure 5A:
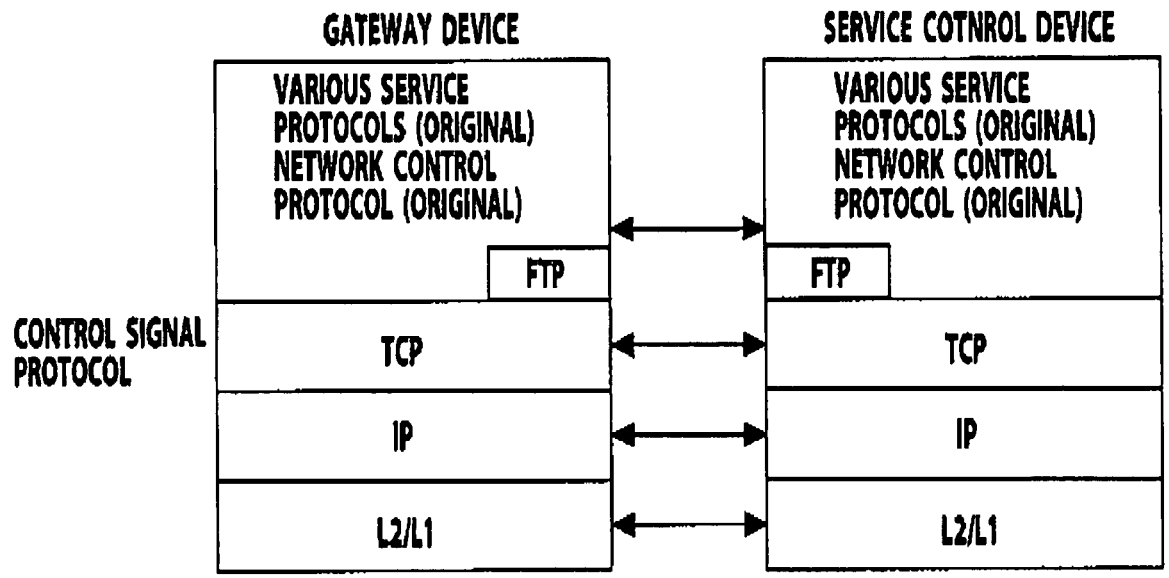
FIG. 5A is a protocol stack diagram of a control signal between a mobile communication network-IP network gateway device and the mobile communication network-IP network service control device in the service providing system according to the first embodiment of the present invention.
Figure 5B:
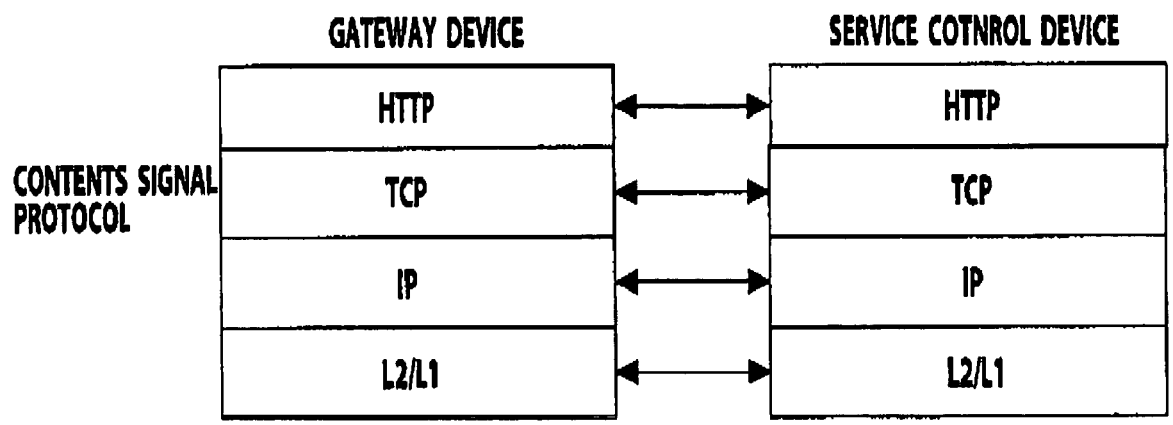
FIG. 5B is a protocol stack diagram of contents signals between the mobile communication network-IP network gateway device and the mobile communication network-IP network service control device in the service providing system according to the first embodiment of the present invention.

FIGS. 5A and 5B show protocol stacks relating to protocol conversion between the mobile communication network-IP network gateway device 10 and the mobile communication network-IP network service control device 20, which is executed by the signal processing unit 111 of the mobile communication network-IP network gateway device 10.

Figure 6A:
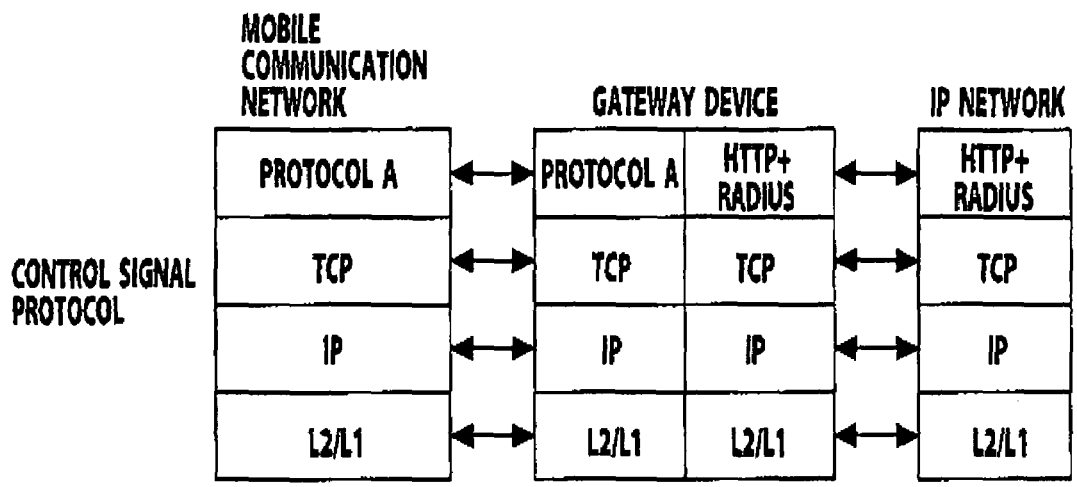
FIG. 6A is a protocol stack diagram of control signals among the mobile communication network-IP network gateway device, the mobile communication terminal, and the IP network.
Figure 6B:
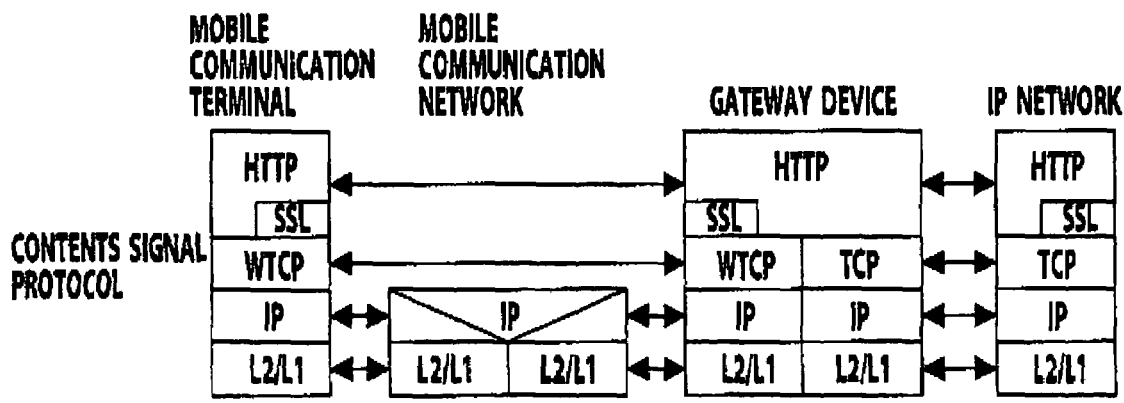
FIG. 6B is a protocol stack diagram of contents signals among the mobile communication network-IP network gateway device, the mobile communication terminal, and the IP network in the service providing system according to the first embodiment of the present invention.

FIGS. 6A and 6B show protocol stacks relating to the protocol conversion between the mobile communication network 100 and IP network 200.

By performing the appropriate protocol conversion in the signal processing unit 111, the mutual communication is achieved between the mobile communication network 100 and the IP network 200, which has conventionally been impossible to be achieved.

In the mobile communication network-IP network gateway device 10 in the present embodiment, protocol conversion is performed on both control signal communication and contents signal communication between the mobile communication network 100 and the IP network 200. In the mobile communication network-IP network gateway device 10, by implementing the mutual conversion function of control signal protocol, it is possible to mutually control the operation between the mobile communication network 100 and the IP network 200 as if it were part of the networks. Moreover, in the mobile communication network-IP network gateway device 10, by implementing the mutual conversion function of the contents signal protocol, it is possible to send and receive a contents signal between the mobile communication network 100 and the IP network 200.

Figure 7:
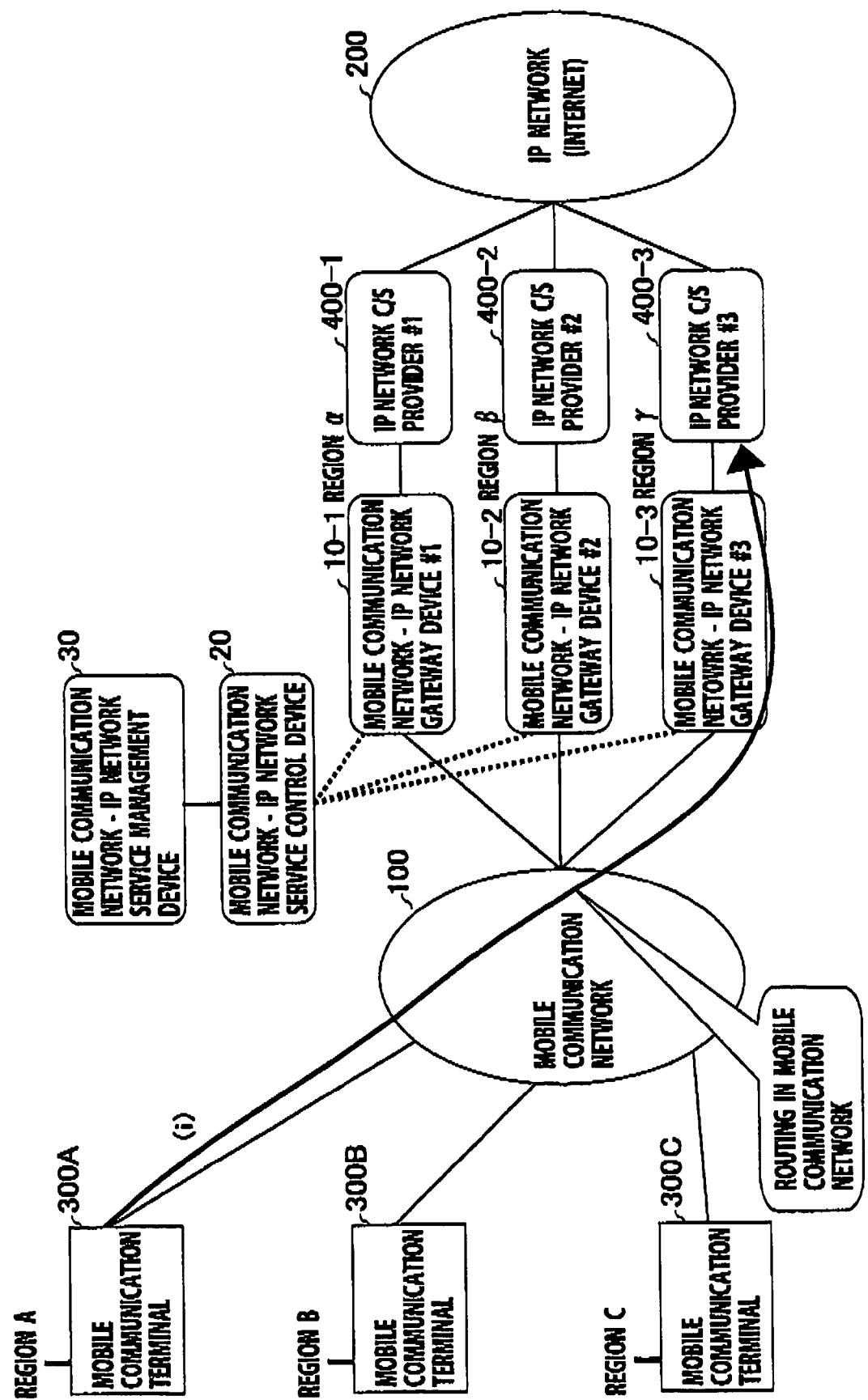
FIG. 7 is an explanatory view showing a routing process by the mobile communication network in the service providing system according to the first embodiment of the present invention, when the mobile communication terminals are connected to the IP network contents and service providers.

FIG. 7 shows a network configuration example of the connection between the mobile communication network 100 and the IP network 200 by using the mobile communication network-IP network gateway device 10. The mobile communication terminal 300 can be located in an arbitrary region and be freely connected to the mobile communication network 100. In addition, the IP network contents and service provider 400 existing in an arbitrary region are contained by the connection processing unit 111 of the mobile communication network-IP network gateway device 10 existing in the region, and connected to the mobile communication network 100. Mobile communication network-IP network gateway devices #1 (10-1), #2 (10-2), and (#3) exist in regions .., .., and .., respectively. Thereafter, IP network contents and service (C/S) providers #1 (400-1) to #3 (400-3) are contained in the mobile communication network-IP network gateway devices #1 (10-1), #2 (10-2), and #3 (10-3), respectively.

As indicated by (i) of FIG. 7, a mobile communication terminal 300A located in a present region A is connected to the IP network contents and service provider #3 (400-3) existing in the region ... At this time, the mobile communication terminal 300A is connected to the mobile communication network 100 through a BS (Base Station) in a region A where the mobile communication terminal 300A is located.

The mobile communication network 100, which has accepted the connection from the mobile communication terminal 300A, identifies the IP network contents and service provider #3, which is the connection destination designated by the mobile communication terminal 300A. Then, the mobile communication network 100 performs the routing to the region .. where the mobile communication network-IP network gateway device #3 (10-3) containing the contents and service provider #3 which is the connection destination exists, in the mobile communication network 100. Thereafter, the mobile communication network 100 transmits a signal to the mobile communication network-IP network gateway device #3 (10-3).

The mobile communication network-IP network gateway device #3 (10-3), which has received the signal, identifies that the IP network contents and service provider #3 (400-3) is the destination of the received IP packets by using the packet destination identifying unit 1123.

After identifying the destination, the mobile communication network-IP network gateway device #3 (10-3) selects a connection path to the IP network contents and service provider #3 (400-3) by using the connection path selecting unit 113. After performing a predetermined signal process on the signal by using the signal processing unit 111, the information extracting/transferring/accumulating unit 112 transmits a signal to the IP network contents and service provider #3 (400-3).

The IP network contents and service provider #3 (400-3), which is the connection destination, is contained in the mobile communication network-IP network gateway device #3 (10-3), and it is possible to transmit a signal directly. In other words, by utilizing the routing function of the existing mobile communication network 100, a routing amount is reduced in the mobile communication network-IP network gateway device 10 of the present invention and the IP network 200.

As shown in FIG. 8, the mobile communication network 100 has a three-layer structure, a service management layer 101, a service control layer 102, and a gateway layer 103.

The mobile communication network-IP network gateway device 10 is associated with the mobile communication network-IP network service management device 30 and the mobile communication network-IP network service control device 20, so as to achieve the three-layer structure corresponding to the mobile communication network 100 and to provide packet service that complements the mobile communication network function. At this time, the mobile communication network-IP network gateway device 10 is completely devoted to signal transmission. As for service execution, the mobile communication network-IP network gateway device 10 totally depends on the mobile communication network-IP network service management device 30 and the mobile communication network-IP network service control device 20.

In addition, the IP network connection processing unit 12-2 provided in the mobile communication network-IP network gateway device 10 connects the mobile communication network 100 and the IP network 200. The communication terminal or the predetermined communication device of the mobile communication network 100 and the communication terminal or the predetermined communication device of the IP network 200 receives not only mere voice communication service and data transfer service but also packet-type service by an enhanced mobile communication network function which is complemented by the association of the mobile communication network-IP network service management device 30, the mobile communication network-IP network service control device 20, and the mobile communication network-IP network gateway device 10.

Furthermore, the Internet connection from the communication terminal or the predetermined communication device 300 of the mobile communication network 100 via the IP network 200 which is connected to the mobile communication network 100 by the mobile communication network-IP network gateway device 10 is enabled by the mobile communication network-IP network gateway device 10.

Specifically, by utilizing the function prepared by the IP network contents and service provider 400 connected to the mobile communication network 100, the communication terminal or the predetermined communication device 300 of the mobile communication network 100 can utilize service achieved by the Internet. Simultaneously, the IP network contents and service provider 400 can be given an opportunity for providing service to the communication terminal or the predetermined communication device 300 of the mobile communication network 100.

The mobile communication network-IP network service management device 30 manages the service contents definitions which define the service (process) contents and control information necessary for providing service as well as performs operations, maintenance, and management of the entire service providing system including all of the mobile communication network-IP network service management device 30, the mobile communication network-IP network service control device 20, and the mobile communication network-IP network gateway device 10.

Based on the service contents definitions defined by the mobile communication network-IP network service management device 30, the mobile communication network-IP network service control device 20 executes various packet-type services (controls) for the IP packets transmitted from the mobile communication terminal 300 as well as the IP network contents and service provider 400 via the mobile communication network-IP network gateway device 10, and returns the execution results thereof to the mobile communication network-IP network gateway device 10.

At this time, the mobile communication network-IP network gateway device 10 devotes itself to transmit the IP packets sent from the mobile communication terminal 300 as well as the IP network contents and service provider 400.

In other words, the mobile communication network-IP network gateway device 10 performs only the transmission of the IP packets, regarding the communication between the mobile communication terminal 300 and the IP network contents and service provider 400. When the IP packets transmitted from the mobile communication terminal 300 or the IP network contents and service provider 400 request the execution of the packet-type service, the mobile communication network-IP network gateway device 10 allocates the IP packets to the mobile communication network-IP network service control device 20 and returns the response results of the service request, which is returned from the mobile communication network-IP network service control device 20, to a service request source.

As indicated by (i) to (iii) in FIG. 8, when the IP packets are transmitted from the mobile communication terminal 300 or the IP network contents and service provider 400, the mobile communication network-IP network gateway device 10 is operated as below.

As indicated by (i) in the drawing, when the mobile communication terminal 300 transmits the IP packet for the IP network contents and service provider 400, routing is performed in the mobile communication network 100. Thereafter, the IP packets are arrived at the mobile communication network-IP network gateway device 10 which contains the IP network contents and service provider 400, the destination.

Receiving the IP packets, the mobile communication network-IP network gateway device 10 identifies the destination of the IP packets, and allocates the IP packets to the corresponding IP network contents and service provider 400. When the response for the IP packets is returned from the IP network contents and service provider 400, the mobile communication network-IP network gateway device 10 returns the response to the mobile communication terminal 300 which is the transmission source.

Moreover, as indicated by (ii) in the drawing, when the mobile communication terminal 300 transmits the IP packets, which indicate a packet service request for the mobile communication network-IP network service control device 20, routing is performed in the mobile communication network 100. The IP packets are arrived at the mobile communication network-IP network gateway device 10 which contains the mobile communication network-IP network service control device 20, the destination.

Receiving the IP packets, the mobile communication network-IP network gateway device 10 identifies the destination of the IP packets, and allocates the IP packets to the corresponding mobile communication network-IP network service control device 20. When the response for the IP packets is returned from the mobile communication network-IP network service control device 20, the mobile communication network-IP network gateway device 10 returns the response to the mobile communication terminal 300 which is the transmission source.

In addition, as indicated by (iii) in the drawing, when the IP network contents and service provider 400 transmits the IP packets which indicate a packet service request for the mobile communication network-IP network service control device 20, the IP packets are arrived at the mobile communication network-IP network gateway device 10 which contains the IP network contents and service provider 400.

Receiving the IP packets, the mobile communication network-IP network gateway device 10 identifies the destination of the IP packets, and allocates the IP packets to the corresponding mobile communication network-IP network service control device 20. When the response for the IP packets is returned from the mobile communication network-IP network service control device 20, the mobile communication network-IP network gateway device 10 returns the response to the IP network contents and service provider 400 which is the transmission source.

Figure 9:
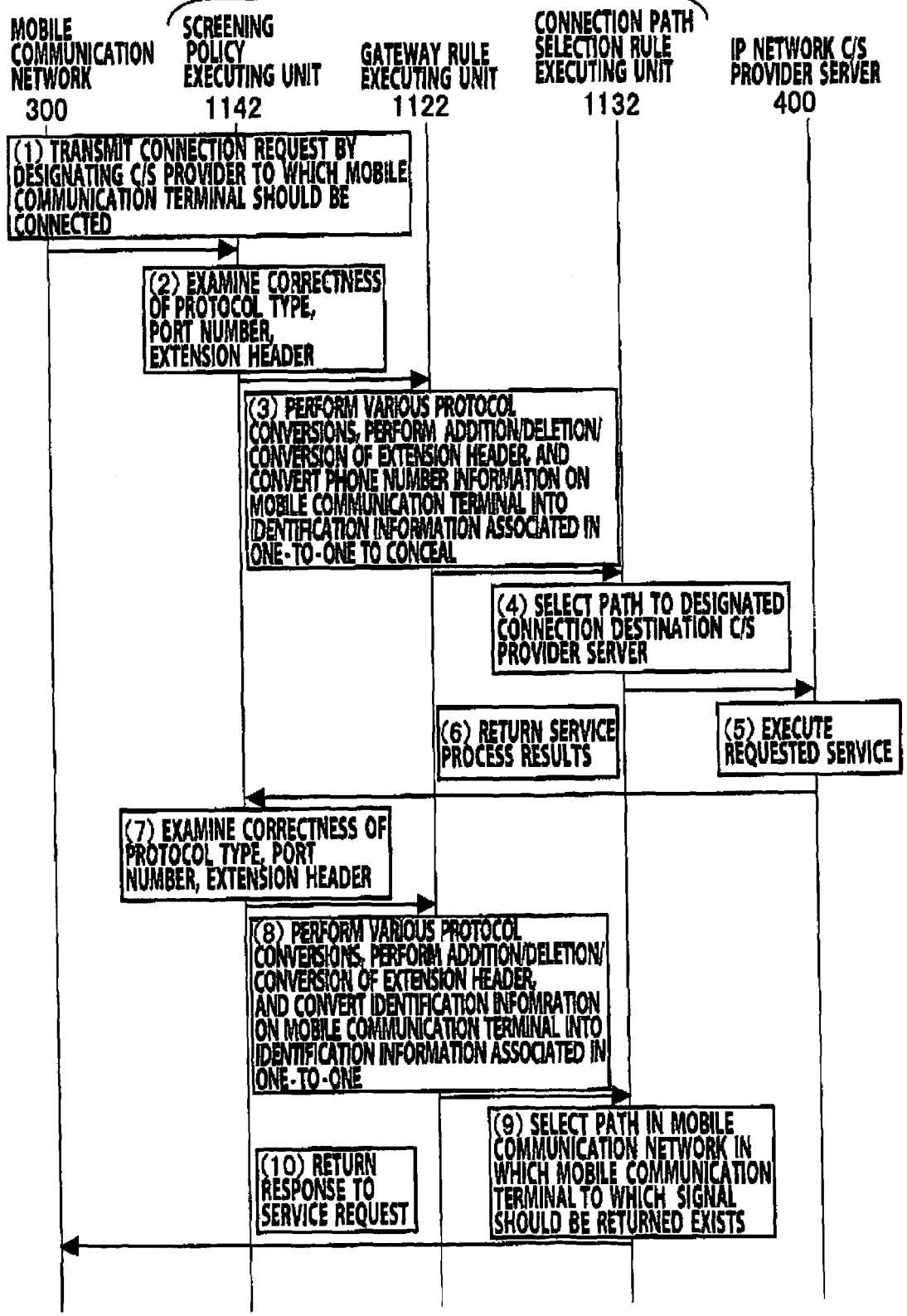
FIG. 9 is a sequence diagram showing the process for concealing user information in communication between the mobile communication terminal and the IP network contents and service provider, via the service providing system according to the first embodiment of the present invention.

FIG. 9 is a diagram showing a sequence in the case where the mobile communication network-IP network gateway device 10 operates as a communication interface while concealing user information in the communication between the mobile communication network 100 and the IP network contents and service provider 400.

In Step (1), the control signal performs connection between the mobile communication terminal 300 and the IP network contents and service provider 400. Specifically, the mobile communication terminal 300 designates the IP network contents and service provider 400 which is the connection destination, and transmits a service request (connection request) to the mobile communication network 100. At this time, the mobile communication terminal 300 connects to the mobile communication network 100 through a mobile communication base station where the terminal itself is located. The mobile communication network 100, which has received the service request from the mobile communication terminal 300, identifies the IP network contents and service provider 400 designated as the connection destination, specifies the mobile communication network-IP network gateway device 10 containing the IP network contents and service provider 400, performs routing in the mobile communication network 100, and transmits the service request to the corresponding mobile communication network-IP network gateway device 10.

In Step (2), the mobile communication network-IP network gateway device 10, which has received the service request from the mobile communication network 100, examines the correctness of the protocol type, the port number, the original header (extension header) by using the screening policy executing unit 1142.

In Step (3), the gateway rule executing unit 1122 of the mobile communication network-IP network gateway device 10 performs processes of various protocol conversions, and addition, deletion and conversion of the original header in response to the received service request, and converts the service request into identification information in one-to-one association with phone number information of the mobile communication terminal 300, so as to conceal the phone number information.

In Step (4), the connection path selection rule executing unit 1132 of the mobile communication network-IP network gateway device 10 selects a path to the IP network contents and service provider 400 which is the connection destination designated by the service request. The mobile communication network-IP network gateway device 10 transmits a service request of the mobile communication terminal 300 through the connection path thus selected.

The IP network contents and service provider 400, which is the service request destination, executes the received service in Step (5), and returns the service process results to the mobile communication network-IP network gateway device 10 in Step (6).

In Step (7), by receiving the service process results from the IP network contents and service provider 400, the mobile communication network-IP network gateway device 10 examines the correctness of the protocol type, the port number, and the original header by using the screening policy executing unit 1142.

In Step (8), the gateway rule executing unit 1122 of the mobile communication network-IP network gateway device 10 performs processes of various protocol conversions, and addition, deletion and conversion of the original header in response to the received service request, and converts the identification information, which has been associated one-to-one previously, into phone number information of the mobile communication terminal 300.

In Step (9), the connection path selection rule executing unit 1132 of the mobile communication network-IP network gateway device 10 selects a path to a mobile communication network 100 where the mobile communication terminal 300, to which a signal should be returned, is located.

In Step (10), the mobile communication network-IP network gateway device 10 transmits a response to the service request from the IP network contents and service provider 400 to the mobile communication terminal 300 which is the service request source, through a path thus selected.

From the above operation, upon receipt of the service request to arbitrary IP network contents and service provider 400 from the mobile communication terminal 300, the mobile communication network-IP network gateway device 10 can give the received service request to the IP network contents and service provider 400 while concealing the user information (information on the mobile communication terminal 300), and relay the response from the IP network contents and service provider 400 for the service request to the mobile communication terminal 300 which is the request source for returning, so as to enable the connection from the mobile communication terminal 300 to the IP network 200.

Figure 10:
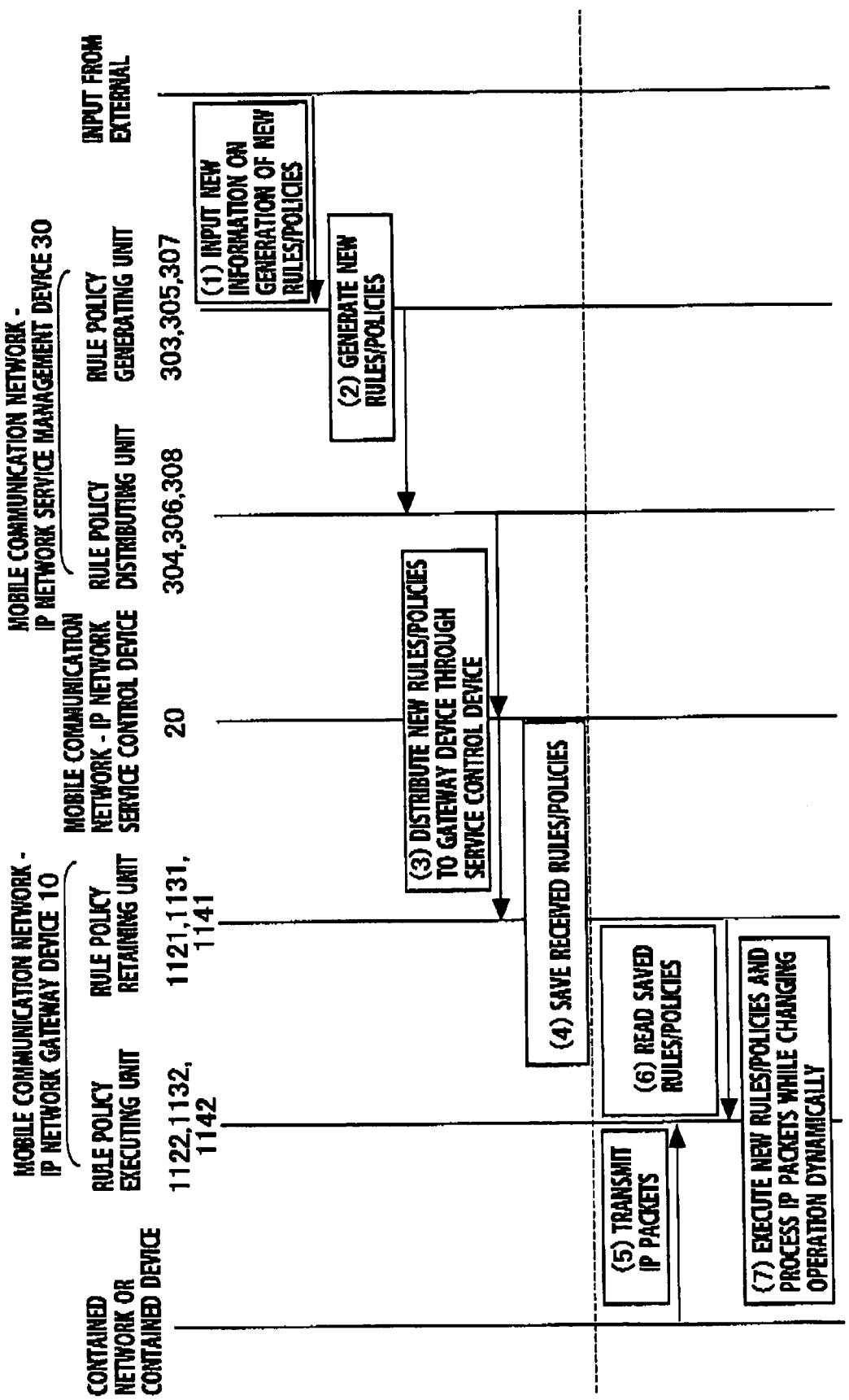
FIG. 10 is a sequence diagram showing the management function of the mobile communication network—the IP network gateway device for the mobile communication network—the IP network service management device in the service providing system according to the first embodiment of the present invention.

FIG. 10 is a diagram showing a sequence, in which the mobile communication network-IP network service management device 30 generates new rules or policies in accordance with an input from external and distributes the new rules or policies to the mobile communication network-IP network gateway device 10, and the mobile communication network-IP network gateway device 10 employs the rules or policies to dynamically process the IP packets.

When new information on the connection path selection rules, the gateway rules, or the screening policies is given to the mobile communication network-IP network service management device 30 from the external by the network administrator in Step (1), the corresponding connection path selection rule generating unit 303, the gateway rule generating unit 305, or the screening policy generating unit 307 generates new rules/policies in Step (2).

In Step (3), the connection path selection rule distributing unit 304, the gateway rule distributing unit 306, or the screening policy distributing unit 308 distributes the newly generated rules or policies to the mobile communication network-IP network gateway device 10 through the mobile communication network-IP network service control device 20.

In Step (4), the corresponding connection path selection rule retaining unit 1131, the gateway rule retaining unit 1121, or the screening policy retaining unit 1141 in the mobile communication network-IP network gateway device 10 saves the received new rules or policies.

In Step (5), thereafter, the IP packets are transmitted to the mobile communication network-IP network gateway device 10, from the mobile communication network 100 and the IP network 200 which are contained in the mobile communication network-IP network gateway device 10, or the mobile communication terminal 300 and the IP network contents and service provider 400.

In Step (6), the rule executing unit or the policy executing unit in the mobile communication network-IP network gateway device 10 corresponding to the received IP packets, in other words, the connection path selection executing unit 1132, the gateway rule executing unit 1122, or the screening policy executing unit 1142 reads out the saved rules or policies from the rule or policy saving units 1131, 1121, or 1141, respectively.

In Step (7), the rule executing unit or the policy executing unit 1122, 1132, or 1142, executes the readout rules or policies.

Thus, by executing the rules or policies newly set during the operation, the mobile communication network-IP network gateway device 10 can process the IP packets while changing the operation dynamically.

Figure 11:
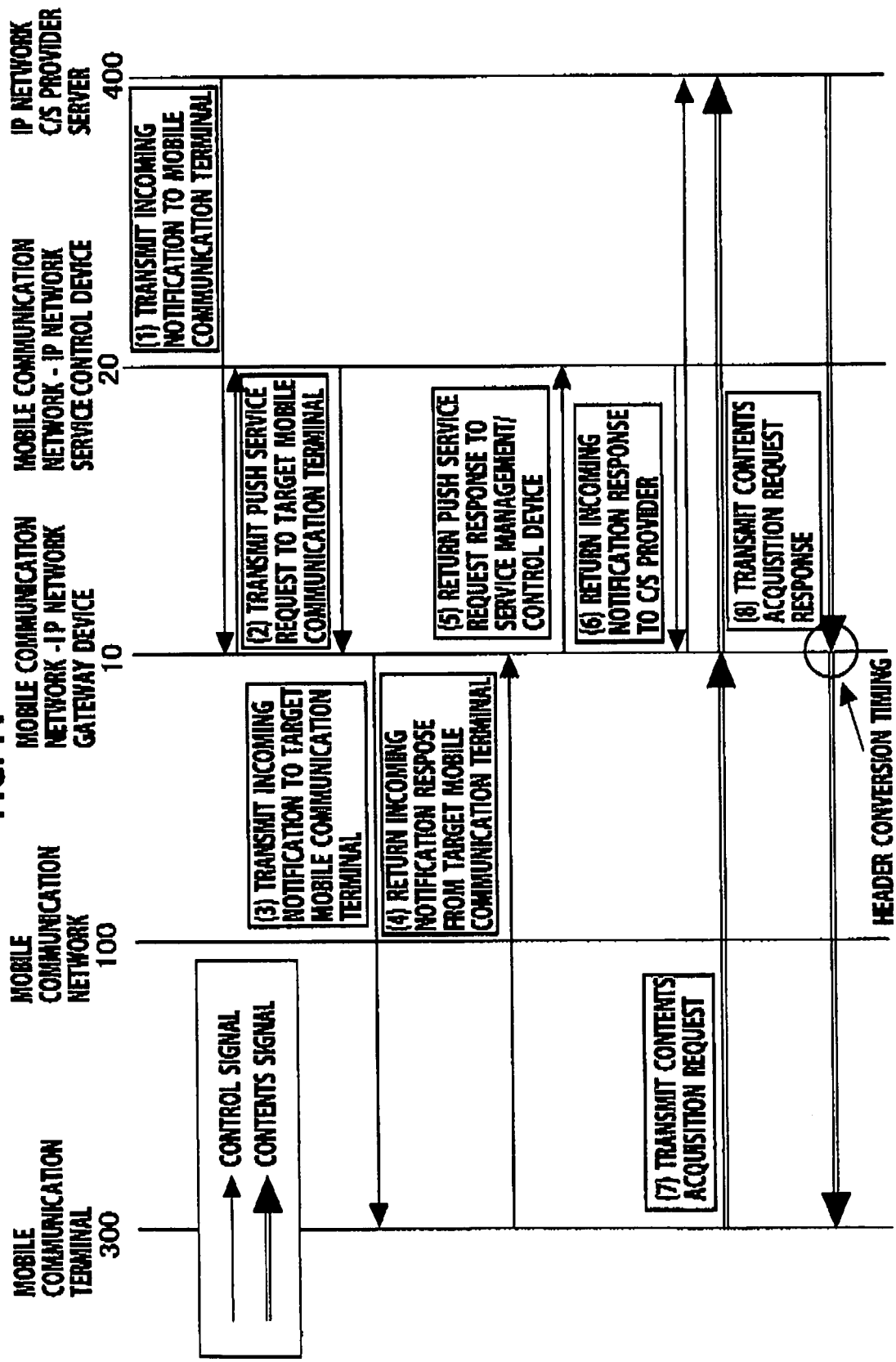
FIG. 11 is a sequence diagram showing the process of Push service from the IP network contents and service provider to the mobile communication terminal, via the service providing system according to the first embodiment of the present invention.

FIG. 11 shows a sequence of a Push service provided to the IP network contents and service provider 400 by the mobile communication network-IP network service control device 20, in other words, a service for distributing the contents to the mobile communication terminal 300 from the IP network contents and service provider 400. This Push service is executed as described below.

In Step (1), the IP network contents and service provider 400 performs a service request (herein, a service request in the Push service) to the mobile communication network-IP network service control device 20 through the mobile communication network-IP network gateway device 10 which contains the IP network contents and service provider 400 itself. The service request in the Push service is contents incoming notification for the mobile communication terminal 300.

In Step (2), the mobile communication network-IP network service control device 20, which has received the Push service requests (contents incoming notification to the mobile communication terminal 300) from the IP network contents and service provider 400, transmits the Push service request for a target mobile communication terminal 300 to the mobile communication network-IP network gateway device 10 which contains the mobile communication network-IP network service control device 20 itself.

In Step (3), the mobile communication network-IP network gateway device 10, which has received the Push request from the mobile communication network-IP network service control device 20, transmits the incoming notifications to the mobile communication terminal 300 through the mobile communication network 100.

In Step (4), the mobile communication terminal 300, which has received the incoming notification, transmits an incoming notification response to the mobile communication network-IP network gateway device 10 through the mobile communication network 100.

In Step (5), the mobile communication network-IP network gateway device 10, which has received the incoming notification response from the mobile communication terminal 300, returns the Push service request response to the mobile communication network-IP network service control device 20.

In Step (6), the mobile communication network-IP network service control device 20, which has received the Push service request response from the mobile communication network-IP network gateway device 10, returns the incoming notification response to the IP network contents and service provider 400. Thus, the IP network contents and the service server 400 can perform the incoming notification of the contents to the mobile communication terminal 300.

In Step (7), by the contents signal communication, the mobile communication terminal 300, which has received the incoming notification, transmits contents acquisition requests to the IP network contents and service provider 400 which has sent the incoming notification. In Step (8), the IP network contents and service provider 400, which has received the contents acquisition requests, returns the contents acquisition request response to the mobile communication terminal 300.

Note that the mobile communication network-IP network gateway device 10 performs a header conversion process for the contents signal sent and received between the mobile communication terminal 300 and the IP network contents and service provider 400.

By using the above procedure, the mobile communication terminal 300 can acquire the contents from the IP network contents and service provider 400. The contents can be distributed to the mobile communication terminal 300 from the side of the IP network contents and service provider 400 by the entire sequence of FIG. 11.

Note that the Push service has been described as an example of service. In addition to this, location information providing service can be provided, in which a present location of the mobile communication terminal 300 is acquired in the mobile communication network-IP network service control device 20 and provided to the IP network contents and service provider 400. A service process, protocol conversion, an interface for the IP network contents and service provider, and the like, which are used at this time, are implemented on the mobile communication network-IP network service control device 20 at an application level on an HTTP.

Thus, in the mobile communication network-IP network gateway device 10 and the gateway connection control method according to the present embodiment, by associating with the mobile communication network-IP network service management device 30 and the mobile communication network-IP network service control device 20, it is possible to provide various mobile communication services. Moreover, it is possible to support a change or addition of functions, by changing or adding the application. Thus, it is possible to support the change or addition flexibly.

Figure 12:
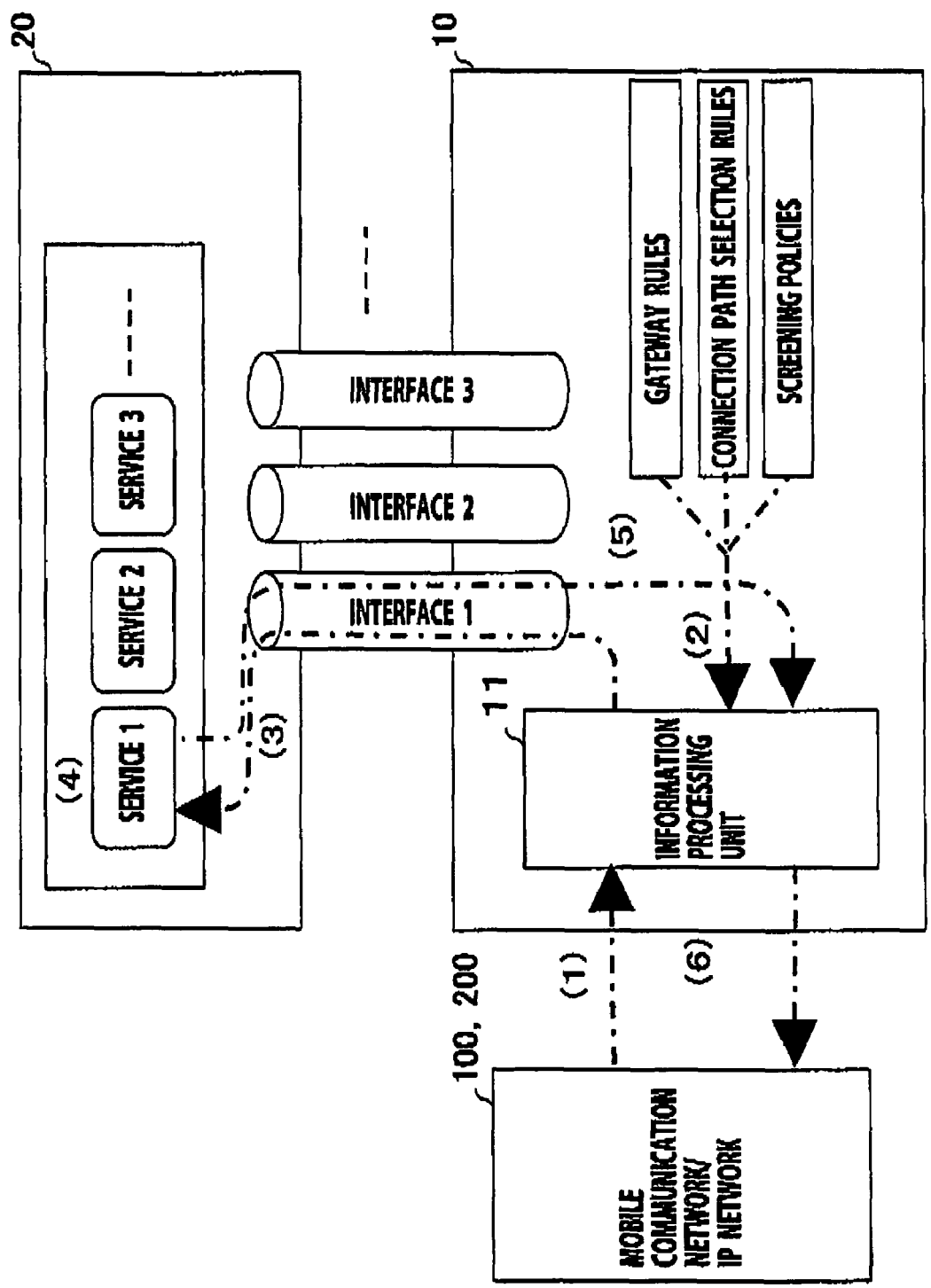
FIG. 12 is an explanatory view showing the operation for providing service from the mobile communication network-IP network service control device to the mobile communication network or the IP network, in the service providing system according to the first embodiment of the present invention.

FIG. 12 shows association function between the mobile communication network-IP network service control device 20 and the mobile communication network 100 or the IP network 200, by the mobile communication network-IP network gateway device 10 according to the present embodiment.

The mobile communication network-IP network gateway device 10 defines individual interfaces 1, 2, and so on, in accordance with a service type between the mobile communication network-IP network service control device 20 and the mobile communication network-IP network gateway device 10. These interfaces 1, 2, and so on are achieved on a software basis for a signal process prepared for each service type. The signal processing unit 111 in the information processing unit 11 functions as one of these interfaces.

Thereupon, the mobile communication network-IP network gateway device 10 judges the service type and the destination requested by the IP packets received from the mobile communication network 100 or the IP network 200. When the destination is judged to be the mobile communication network-IP network service control device 20, the mobile communication network-IP network gateway device 10 performs the protocol conversion in accordance with the service type, and transfers the IP packets to the mobile communication network-IP network service control device 20 through a interface corresponding to the service type among the interfaces 1, 2, and so on.

In addition, the mobile communication network-IP network gateway device 10 performs inverse protocol conversion on the IP packets of the service request response from the mobile communication network-IP network service control device 20, and returns the packets to the mobile communication network 100 or the IP network 200 which is the service request source.

In other words, in providing service to the communication terminal or the predetermined communication devices 300 or 400 of the mobile communication network 100 or the IP network 200 utilizing the mobile communication network-IP network service control device 20, the mobile communication network-IP network gateway device 10 is configured to perform all the protocol conversions and packet transferring processes for the IP packets transmitted and received between the mobile communication network-IP network service control device 20 and the mobile communication network 100 or the IP network 200.

The processing function of this mobile communication network-IP network gateway device 10 is further detailed.

When the IP packets are transmitted from the mobile communication network 100 or the IP network 200 to the mobile communication network-IP network gateway device 10 in Step (1), the mobile communication network-IP network gateway device 10 performs judging process by each of the rule/policy executing units based on information described on various rules/policies which are distributed from the mobile communication network-IP network service management device 30 and saved in the rule/policy retaining unit in Step (2).

In Step (3), when the mobile communication network-IP network gateway device 10 judges that the received IP packets are allowed to pass through, the destination of the IP packets is identified. Herein, the mobile communication network-IP network gateway device 10 identifies the mobile communication network-IP network service control device 20 as the destination.

Thereupon, the mobile communication network-IP network gateway device 10 transfers the IP packets to the mobile communication network-IP network service control device 20. At this time, the mobile communication network-IP network gateway device 10 performs the protocol conversion suitable for a service dedicated interface (herein, an interface 1) in accordance with the service type requested by the IP packets, and transfers the IP packets to the mobile communication network-IP network service control device 20 through the service dedicated interface.

Thereafter, the mobile communication network-IP network gateway device 10 retains the service type, the destination, the source, and the identification number of the transferred IP packets.

The mobile communication network-IP network service control device 20 executes the service process requested by the received IP packets in Step (4), and returns the IP packets, to which the service process has been performed, to the mobile communication network-IP network gateway device 10 through the dedicated interface 1 in Step (5).

In Step (6), the mobile communication network-IP network gateway device 10 performs the inverse protocol conversion on the IP packets returned from the mobile communication network-IP network service control device 20 based on the information such as the retained service type, destination, source, and identification number, judges the destination to which the IP packets should be returned, and transfers the IP packets to the corresponding destination.

As described above, by transferring the IP packet required for providing service to the communication terminal or the predetermined communication device 300 of the mobile communication network 100 or the communication terminal or the predetermined communication device of the IP network 200 and performing protocol conversion/inverse conversion required at this time in the mobile communication network-IP network gateway device 10 according to the present embodiment, it is possible to provide basic functions to the mobile communication network-IP network service control device 20 to be dedicated for the packet high-value-added service process.

Figure 13:
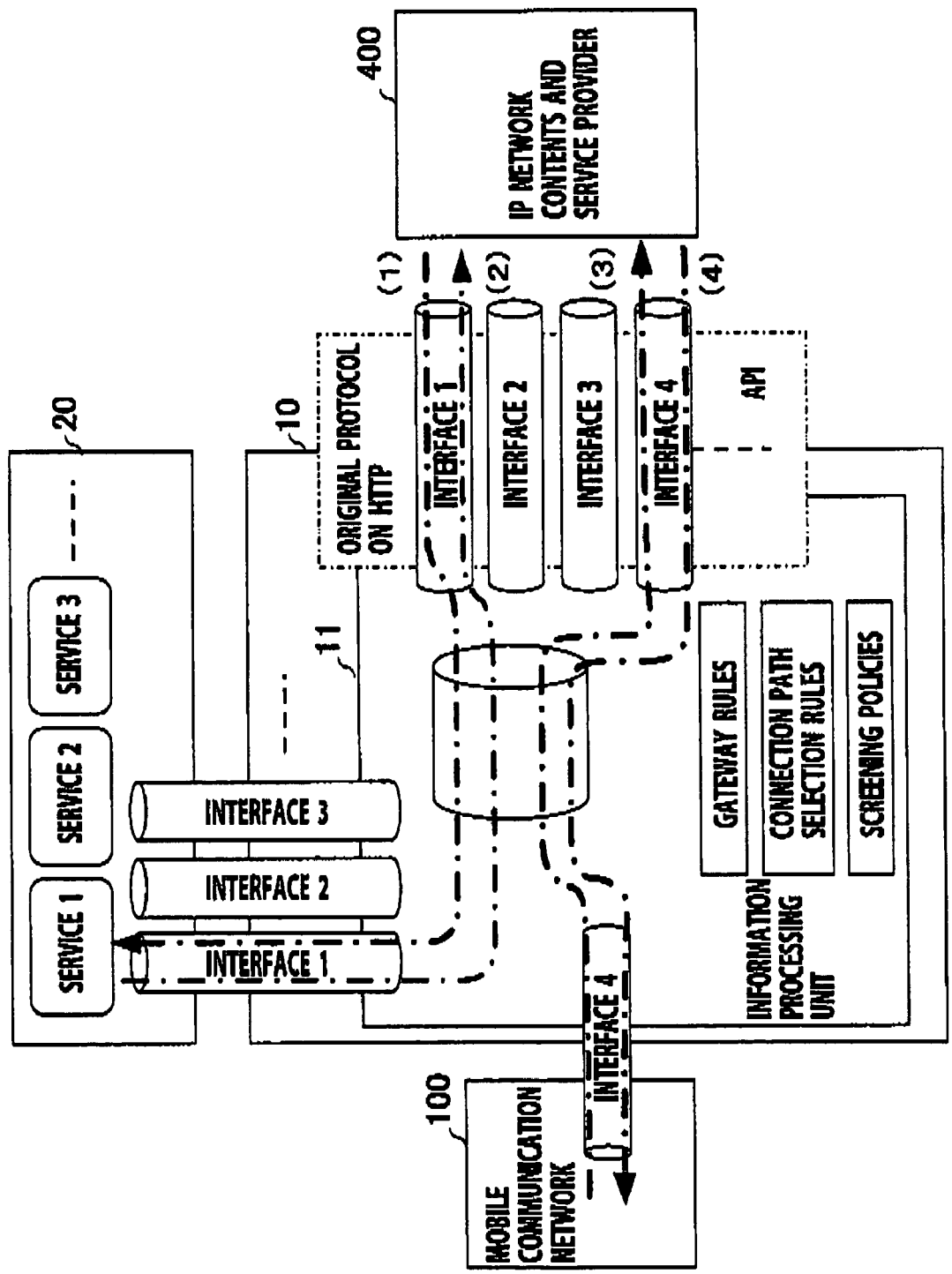
FIG. 13 is an explanatory view showing the gateway operation of the mobile communication network-IP network gateway device in the service providing system according to the first embodiment of the present invention.

FIG. 13 shows the function of relay of the mobile communication network-IP network gateway device 10 between the mobile communication network 100 and the IP network 200, in order to distribute contents and services between the mobile communication terminal 300 and the IP contents and service provider 400.

The mobile communication network-IP network gateway device 10 contains the IP network 200 and contains IP network contents and service provider 400 through the IP network 200.

The mobile communication network-IP network gateway device 10 performs the operation and process, which are defined by the information described in the various rules/policies distributed from the mobile communication network-IP network service management device 30, for the IP packets transmitted from the IP network contents and service provider 400, judges the service type and the destination requested by the IP packets, performs the protocol conversion in accordance with the corresponding service type, and transfers the IP packets to the corresponding destination.

In addition, the mobile communication network-IP network gateway device 10 performs the operation and process, which are defined by information described in the various rules/policies distributed from the mobile communication network-IP network service management device 30, for the IP packets transmitted from the mobile communication network 100 and the mobile communication network-IP network service control device 20, of which the destination is the IP network contents and service provider 400, judges the service type requested by the IP packets and the IP network contents and service provider 400, the destination, performs the protocol conversion in accordance with the corresponding service, and transfers the IP packets to the corresponding destination.

Thus, the mobile communication network-IP network gateway device 10 according to the present embodiment achieves the mutual communication among the mobile communication network-IP network service control device 20, the mobile communication network 100, and the IP network contents and service provider 400.

The mobile communication network-IP network gateway device 10 contains the IP network contents and service provider 400, defines minimum functions, prepared in the mobile communication network-IP network service control device 20 and the mobile communication network 100 by using the original header or the original method on the original protocol, or various service interfaces which invoke the services, between the mobile communication network-IP network gateway device 10 and the IP network contents and service provider 400. Using one or a combination of these service interfaces enables the IP network contents and service provider 400 to utilize the various functions of the mobile communication network 100.

Thus, the IP contents and service provider 400 can provide various services, which utilize the mobile communication network functions, to the communication terminal or the predetermined communication device 300 contained in the mobile communication network 100, by combining these service interfaces as necessary.

In other words, the mobile communication network-IP network gateway device 10 according to the present embodiment can provide platforms, which are freely customized and for providing service utilizing the mobile communication network function to the communication terminal or the predetermined communication device 300 of the side of the mobile communication network 100, to the IP network contents and service provider 400.

Referring to FIG. 13, the connection of xSP and the platform providing functions of the mobile communication network-IP network gateway device 10 according to the present embodiment are described.

As shown in FIG. 13, the mobile communication network-IP network gateway device 10 has several network interfaces 1, 2 and so on for invoking a minimum mobile communication network function defined by the original header or the original method on the original protocol. Theses network interfaces 1, 2, and so on are implemented on HTTP. In addition, the mobile communication network-IP network gateway device 10 has service control device interfaces 1, 2, and so on for each of services 1, 2, and so on, between the mobile communication network-IP network service control device 20 and the mobile communication network-IP network gateway device 10. These service control device interfaces 1, 2, and so on are original protocols implemented on the application layer or the equivalent layer.

In Step (1), the IP network contents and service provider 400 transmit, to the mobile communication network-IP network gateway device 10, the IP packets of the service request for utilizing the mobile communication network function service (herein, service 1) provided in the mobile communication network-IP network service control device 20.

The original protocol on HTTP (herein, an original protocol 1 on HTTP) is used as the protocol to invoke the service 1. Through the original protocol 1, a service request is transmitted to the mobile communication network-IP network gateway device 10. At this time, the IP network contents and service provider 400 designate the mobile communication network function which is invoked by an extension method, in other words, the network interface, and designate invoking conditions of the functions by the extension header.

The mobile communication network-IP network gateway device 10 identifies the service type, the destination, and service request permission/rejection requested by the IP packets in accordance with information described in various rules/policies.

Thereafter, the mobile communication network-IP network gateway device 10 executes protocol conversion in accordance with the requested service type by the network interface 1 for the service 1. In other words, the mobile communication network-IP network gateway device 10 converts the original protocol 1 on HTTP into the original protocol 1 for the service control device interface 1. The mobile communication network-IP network gateway device 10 transmits the IP packets to the service control device 20 which is the destination, through the service control device interface 1.

In Step (2), the mobile communication network-IP network service control device 20 which accepted the service request from the IP network contents and service provider 400 processes the requested service 1, and returns the results thereof to the mobile communication network-IP network gateway device 10 through the service control device interface 1 dedicated for the service.

The mobile communication network-IP network gateway device 10 performs processes of inverse protocol conventions as well as the addition, deletion and the change of the original header for the received results by using the network interface 1 corresponding to the service 1, and returns the results to the IP network contents and service provider 400 which is the service request source.

Thus, the IP network contents and service provider 400 can select and utilize mobile communication network function services provided in the mobile communication network-IP network service control device 20 through the mobile communication network-IP network gateway device 10 on a minimum basis.

In Step (3), the communication terminal or the predetermined communication device 300 contained in the mobile communication network 100 can access the IP network contents and service provider 400 existing in the IP network 200 through a specific interface (herein, an interface 4).

In Step (4), accepting the service request of the HTTP protocol base from the communication terminal or the predetermined communication device 300 which is contained in the mobile communication network 100, the IP network contents and service provider 400 returns responses for the corresponding Web contents or the service requests through the interface 4.

Thus, by utilizing one or a plurality of the mobile communication network function services on a minimum basis through the interface provided in the mobile communication network-IP network service control device 20, the IP network contents and service provider 400 can construct the original service utilizing the mobile communication network functions, and provide original services utilizing the mobile communication network function to the service request of HTTP protocol base from the communication terminal or the predetermined communication device 300 of the mobile communication network 100.

As a result, the mobile communication network-IP network gateway device 10 in the service providing system according to the present embodiment can provide the platforms to enable the IP network contents and service provider 400 in the IP network 200 to provide original services utilizing the mobile communication network function to the communication terminal or the predetermined communication device 300 of the mobile communication network 100.

For example, described is the case where the mobile communication network-IP network service control device 20 provides "present location information service" as a service 1 by using an interface 1 and the IP network contents and service provider 400 provides "walking distance measuring service" to the mobile communication terminal 300 of the side of the mobile communication network 100.

(i) The IP network contents and service provider 400 receives a walking distance measuring service request from the mobile communication terminal 300 through the mobile communication network-IP network gateway device 10.

(ii) In this case, the IP network contents and service provider 400 transmits the present location measuring service request of the mobile communication terminal 300 to the mobile communication network-IP network service control device 20 through the mobile communication network-IP network gateway device 10.

(iii) By contrast, the mobile communication network-IP network gateway device 10 performs protocol conversion and other necessary processes by using the network interface 1, and transfers the present location measuring service request to the service 1 of the mobile communication network-IP network service control device 20 through the service control device interface 1.

(iv) Receiving the request of the service 1, the mobile communication network-IP network service control device 20 executes the present location search for the mobile communication terminal 300 and returns the search results thereof to the mobile communication network-IP network gateway device 10 also through the service control device interface 1. Thereafter, the mobile communication network-IP network gateway device 10 performs the inverse protocol conversion and other necessary processes by using the network interface 1 and returns the present location information to the IP network contents and service provider 400 which is the service request source.

(v) The IP network contents and service provider 400 repeats the same present location measuring service request at every certain period of time, for example, one minute. The IP network contents and service provider 400 receives the present location information which is the service response results every minute, and saves the present location information as the present location trace data of the mobile communication terminal 300.

(vi) When the mobile communication terminal 300 transmits the reference request for the walking distance results and the IP network contents and service provider 400 receives the request, the IP network contents and service provider 400 composes the map information provided in the IP network contents and service provider 400 and the present location trace data, display, on a map, the walking path from the point where the walking distance calculation starting request is transmitted from the mobile communication terminal 300 to the point the reference request for the walking distance results is transmitted, as well as calculate and transmit the total walking distance to the mobile communication terminal 300 through the mobile communication network-IP network gateway device 10.

Thus, by periodically and repeatedly utilizing the present location searching service which is one of the minimum services of the mobile communication network-IP network service control device 20, the IP network contents and service provider 400 can provide an applicant (a mobile communication terminal 30 owned by this person) of the walking distance measuring service with the service for notifying the map of the walking path from the foregoing applying point to the reference point and the total walking distance.

Moreover, as an another example, it is possible to make the IP network contents and service provider 400 provide service for notifying a sightseeing spot, a restaurant, a shopping spot and the like near the present location of the mobile communication terminal 300.

In this case, upon receipt of the spot information service request from the mobile communication terminal 300, the IP network contents and service provider 400 utilizes the present location measuring service provided by the mobile communication network-IP network service control device 20, so as to identify the present location of the mobile communication terminal 300 which is the inquire source. Then, the IP network contents and service provider 400 collates the present location with the map information contained in the device 400, so as to extract a restaurant existing in the radius of 100 m from the present location. Accordingly, the IP network contents and service provider 400 can provide spot information service for transmitting the map information indicating the present location and the existing point of the object spot to the mobile communication terminal 300 which is the inquire source.

Figure 20:
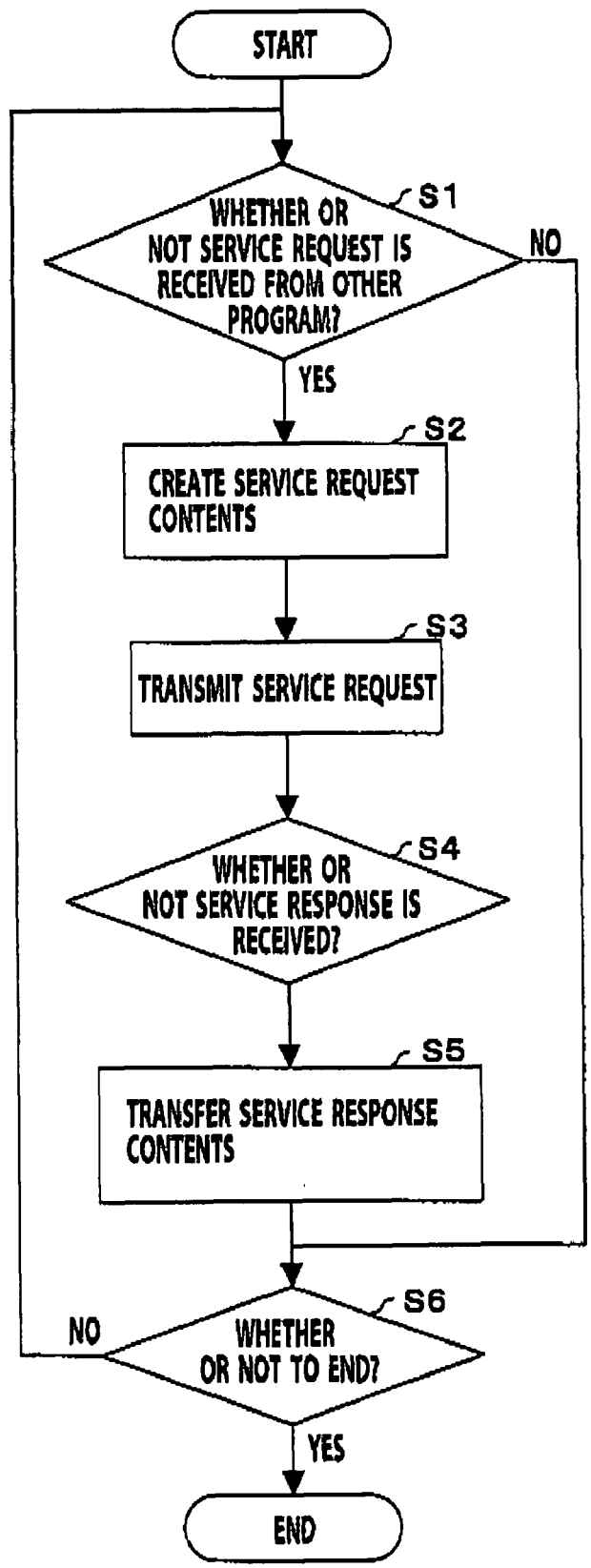
FIG. 20 is a flow chart of a service utilization program of the IP network contents and service provider utilizing the functions of the service providing system according to the first embodiment of the present invention.

The IP network contents and service provider 400 which is about to receive the foregoing service executes the processing program shown in FIG. 20.

In Step S1, the IP network contents and service provider 400 waits until receiving a service request (e.g., present location walking measuring service request) from other program (e.g., walking distance measuring service).

Upon receipt of the service request, the IP network contents and service provider 400 follows YES and moves onto Step S2. When the IP network contents and service provider 400 does not receive the service request, the IP network contents and service provider 400 waits unless ending. In other words, the IP network and service provider 400 follows NO at Step S1 and also follows NO in the judgment of "end" in Step S6.

In Step S2, the IP network contents and service provider 400 judges the contents of the service request, and creates a service request including a service type that should be requested to the mobile communication network-IP network service control device 400 and the service contents thereof. For example, the IP network contents and service provider 400 creates the service request, which is a present location measuring service request and includes service contents requesting the present location measurement of the communication terminal or the communication device of a specific phone number.

In Step S3, the IP network contents and service provider 400 sends the created service request to the IP network 200, by designating a URL of the mobile communication network-IP network service control device 20.

In the service providing system of the present embodiment, the mobile communication network-IP network gateway device 10, which contains the mobile communication network-IP network service control device 20 designated by the foregoing URL, receives the aforementioned service request, so as to transfer it to the service 1 of the mobile communication network-IP network service control device 20 by using the aforementioned interface 1. Thereafter, the present location measured by the mobile communication network-IP network service control device 20 is returned to the IP network contents and service provider 400 as a response to the aforementioned service request.

In Step S4, after transmitting the service request, the IP network contents and service provider 400 waits until receiving the response to the service.

In Step S5, upon receipt of the service request response from the foregoing mobile communication network-IP network service control device 20, the IP network contents and service provider 400 transfers the contents of the service response to the other program which is the request source.

In Step S6, the IP network contents and service provider 400 waits until the next service request is transmitted from the other program unless an end command is received.

Thus, the other program repeats to utilize the present program to repeatedly request the service request on a minimum basis to the mobile communication network-IP network service control device 20 as well as accumulates and utilizes the service responses. Accordingly, various services can be provided in the side of the IP network contents and service provider 400.

Next, the protocol conversion function of the mobile communication network-IP network gateway device 10 is described with reference to FIGS. 14 and 15.

When the mobile communication network-IP network gateway device 10 according to the present embodiment relays the IP packets transmitted and received to and from either the mobile communication network 100, the IP network 200, or the mobile communication network-IP network service control device 20, which are contained in the device 10, in order to achieve not only the protocol conversion between the upper and lower layers following the OSI reference model or the different protocol conversion between the same layer but also the mutual communication between the networks, the devices, or the network and the device, the mobile communication network-IP network gateway device 10 performs the original protocol conversion by performing addition, deletion and conversion of the original header or the original method, and packet transition, discarding and path selection and so on, in accordance with the information described on the gateway rules, screening policies and connection path selection rules distributed from the mobile communication network-IP network service management device 30 on the original protocol defined in the application layer or the equivalent layer. Thus, the mobile communication network-IP network gateway device 10 performs mutual communication with either the mobile communication network 100, the IP network 200, or the mobile communication network-IP network service control device 20.

Thus, the present mobile communication network-IP network gateway device 10 judges the IP packets transmitted from one of the mobile communication network 100, the IP network 200, and the mobile communication network-IP network service control device 20, in terms of the conditions including a protocol type, the source and the destination, and correctness of the original header and the original method defined on HTTP and so on, in accordance with the information described on the screening policies. Thereafter, the mobile communication network-IP network gateway device 10 determines whether or not to relay the IP packets.

In addition, based on the screening policies, the mobile communication network-IP network gateway device 10 discards the IP packets to avoid congestion, when the IP packets more than the limit of the process capabilities of the mobile communication network-IP network service management device 30, the mobile communication network-IP network service control device 20, or itself are transmitted.

Moreover, the mobile communication network-IP network gateway device 10 judges the received IP packets in accordance with the information described on the gateway rules in terms of the type and the destination of the service request. The mobile communication network-IP network gateway device 10 performs the protocol conversion between the upper and lower layers, the conversion to different protocol in the same layers, or the conversion of the original header or the original method on the original protocol defined on HTTP.

Moreover, the mobile communication network-IP network gateway device 10 reads out the information designated by the service request, the destination, and the original protocol from the received IP packets, judges the network or the device, to which the IP packets should be transferred, and the connection path for the transfer in accordance with the information described on the connection path selection rules, and transfers the IP packets in accordance with the judgment.

Furthermore, the mobile communication network-IP network gateway device 10 can interpret and edit the original header and the original method on the original protocol. For the ones transmitted using the original protocol among the IP packets transmitted from the mobile communication network 100, the IP network 200, or the mobile communication network-IP network service control device 20, the mobile communication network-IP network gateway device 10

(1) judges the correctness of the original header or the original method of the IP packets by the judgment in accordance with the information described on the screening policies, and determines the operation such as transferring or discarding the IP packets;

(2) interprets the original header or the original method of the IP packets by the judgment in accordance with the information described on the gateway rules, acquires information including the service request type and the destination of the IP packets and so on, and performs addition, deletion or change of the original header or the original method as necessary; or (3) transfers the IP packets to the target network or device by the judgment in accordance with the information described on the connection path selection rules.

Thus, the mobile communication network-IP network gateway device 10 enables mutual communication among the mobile communication network 100, the IP network 200, and the mobile communication network-IP network service control device 20 by using the original protocol.

Figure 14:
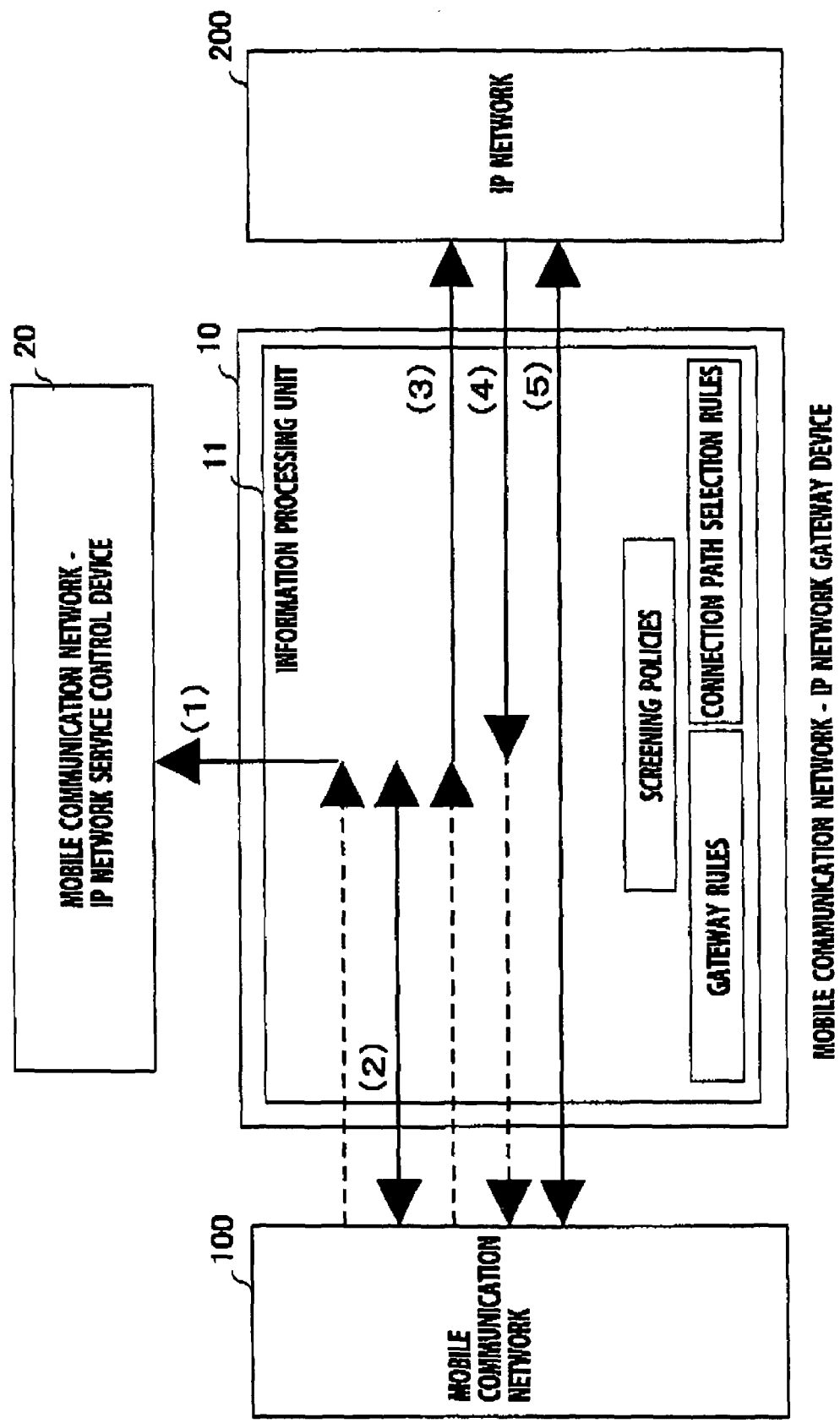
FIG. 14 is an explanatory view showing the protocol conversion function of the mobile communication network-IP network gateway device in the service providing system according to the first embodiment of the present invention.

Referring to FIG. 14, the operation of the mobile communication network-IP network gateway device 10 having the above features is described.

Upon performing the communication by the original protocol on HTTP, the communication terminal or the predetermined communication device 300 of the side of the mobile communication network 100 and the communication terminal or the predetermined communication device 400 of the side of the IP network 200 transmit the IP packets by using the standard method of HTTP or the original method and identification information (URI) indicating the destination of the IP packets.

The mobile communication network-IP network gateway device 10 examines the source, the destination, the used protocol, the designated port number, and the presence of an irregular original method and an original header of the received IP packets, and discards the IP packets that are against the screening policies.

Meanwhile, the mobile communication network-IP network gateway device 10 examines the identification information URI indicating the destination for the IP packets that follow the screening policies, and judges the network or the device, to which the IP packets should be transferred, in accordance with the connection path selection rules.

The mobile communication network-IP network gateway device 10 performs the various protocol conversions and processes including the addition, deletion or conversion of the original header shown in the undermentioned (1) to (5), for the IP packets transmitted from the network and the device contained therein and the IP packets transmitted to the network or the device in accordance with the information described in the gateway rules.

Reference numeral (1) in FIG. 14 indicates the process for the IP packets transmitted from the mobile communication network 100 to the mobile communication network-IP network service control device 20.

When the destination designated by the IP packets transmitted from the mobile communication network 100 to the mobile communication network-IP network gateway device 10 is the mobile communication network-IP network service control device 20, the mobile communication network-IP network gateway device 10 judges the mobile communication network-IP network service control device 20, to which the IP packets should be transferred, by using the connection path selection rules, and determines the path to the corresponding mobile communication network-IP network service control device 20.

At this time, the mobile communication network-IP network gateway device 10 adds the original header to the IP packets and transfers the IP packets, so that the mobile communication network-IP network service control device 20 can identify the communication terminal or the predetermined communication device 300 of the mobile communication network 100 which is the source of the IP packets.

Note that the value of the original header added this time is not directly concerned with personal information such as a phone number of the mobile communication terminal 300, but is identification information associated with the phone number of the mobile communication terminal 300 in one-to-one, which is defined by the gateway rules.

Reference numeral (2) in FIG. 14 indicates the process for the communication between the mobile communication network 100 and the mobile communication network-IP network gateway device 10. The mobile communication network-IP network gateway device 10 does not edit the original header particularly in this section, or the like. Instead, the mobile communication network-IP network gateway device 10 performs the protocol conversion between the network layers in the OSI reference model.

Reference numeral (3) in FIG. 14 indicates the process for the IP packets transmitted from the mobile communication network-IP network gateway device 10 to the IP network 200 (IP network contents and service provider 400).

When the destination designated by the IP packets transmitted from the mobile communication network 100 to the mobile communication network-IP network gateway device 10 is the IP network contents and service provider 400, the mobile communication network-IP network gateway device 10 judges the IP network contents and service provider 400, to which the IP packets should be transferred, by using the connection path selection rules, and selects the path to the corresponding IP network contents and service provider 400.

At this time, the mobile communication network-IP network gateway device 10 adds the original header to the IP packets and transfers the IP packets, so that the IP network contents and service provider 400 can identify the communication terminal or the predetermined communication device 300 of the mobile communication network 100 which is the source of the IP packets.

Note that, also in this case, the value of the added original header is not directly concerned with personal information such as a phone number of the mobile communication terminal 300, but is identification information which is defined by the gateway rules and associated with the phone number of the mobile communication terminal 300 in one-to-one.

Reference numeral (4) in FIG. 14 indicates the process for the IP packets from the IP network 200 to the mobile communication network 100.

A charge for IP packet communication is normally performed for the communication terminal or the predetermined communication device 300 of the mobile communication network 100. However, when the mobile communication network-IP network gateway device 10 receives the IP packets for the mobile communication network 100 transmitted from the IP network 200, the charging destination for the IP packet communication can be designated to the IP network contents and service provider 400 which is the source, by using the original header.

Note that this original header is used only between the mobile communication network-IP network gateway device 10 and the IP network 200. When the original header is added to the IP packets received from the IP network 200, the mobile communication network-IP network gateway device 10 deletes the original header, and transfers the IP packets to the mobile communication network 100.

Reference numeral (5) in FIG. 14 indicates the process for the IP packets between the mobile communication network and the IP network.

For Web access from the communication terminal or the predetermined communication device 300 of the mobile communication network 100 to the IP network 200, normal HTTP protocol is used, and only a normal HTTP method and an HTTP header are used.

Thereupon, the mobile communication network-IP network gateway device 10 does not particularly perform the addition, deletion and the conversion regarding the normal HTTP header, but merely performs the IP packet transfer.

However, in the Push service (e.g., mail sending service) of the contents from the IP network contents and service provider 400 to the communication terminal or the predetermined communication device 300 of the mobile communication network 100, as shown in FIG. 15, the original header used in the mobile communication network 100 and the original header used in the IP network 200 are different. Thus, the conversion of the original header is performed in the mobile communication network-IP network gateway device 10 properly.

Note that, by changing the gateway rules properly, it is possible to change the judgment on the addition, deletion and conversion of the original header as described above. The mobile communication network-IP network gateway device 10 can define its operation by the gateway rules properly.

All of these rule changes are performed in the mobile communication network-IP network service management device 30 and distributed to the mobile communication network-IP network gateway device 10 through the mobile communication network-IP network service control device 20 to be retained.

Specific examples 1 to 4 of the protocol conversion are described with reference to FIGS. 16 to 19.

CONVERSION EXAMPLE 1

Figure 16:
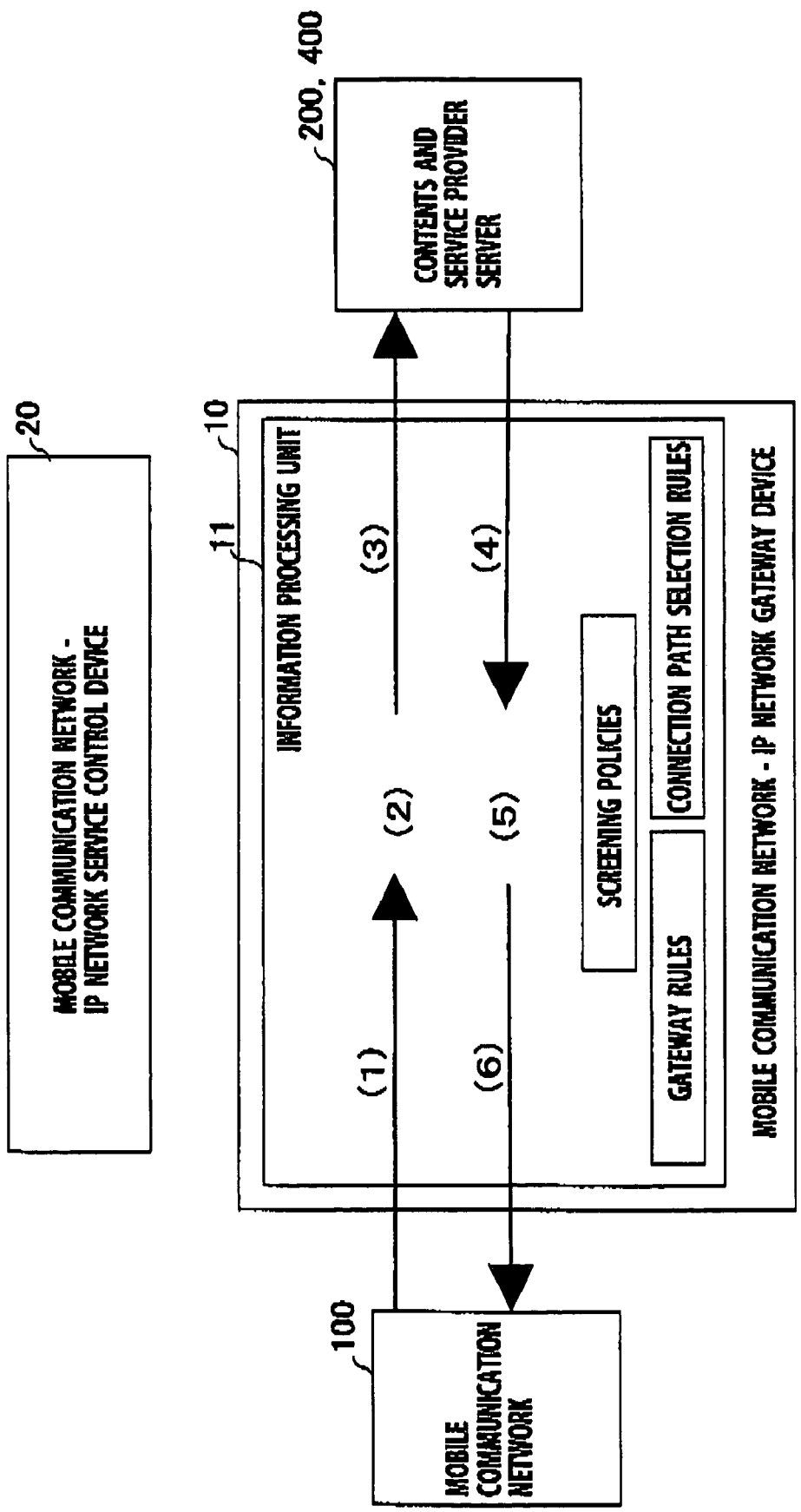
FIG. 16 is an explanatory view showing functions of a protocol conversion example 1 of the mobile communication network-IP network gateway device in the service providing system according to the first embodiment of the present invention.

Conversion Example 1 of FIG. 16 shows the conversion process between an original protocol A and an original protocol on HTTP.

The mobile communication network 100 and the mobile communication network-IP network service control device 20 employs the original protocol A as a control signal protocol. Since a general entrepreneur cannot use this original protocol A, the original protocol on HTTP is defined by defining the original header or the original method as a control signal protocol between the mobile communication network-IP network gateway device 10 and the IP network 200.

Moreover, the mobile communication network-IP network gateway device 10 executes the conversion process between the original protocol A and the original protocol on HTTP. This enables the control signals to be mutually communicated between the mobile communication network 100 and the IP network 200. The protocol conversion process is described below.

As shown in FIG. 16, in Step (1), a control signal for the IP network 200 from the mobile communication network 100 is transmitted to the mobile communication network-IP network gateway device 10 by the original protocol A.

In Step (2), the information processing unit 11 of the mobile communication network-IP network gateway device 10 judges that the signal type is a control signal by the judgment of the gateway rules, and converts the original protocol A of the side of the mobile communication network 100 into the original protocol on HTTP for the IP network 200.

In Step (3), the information processing unit 11 of the mobile communication network-IP network gateway device 10 employs the original protocol on HTTP converted in Step (2) to transmit the received control signal to the IP network contents and service provider 400 which is the destination.

In Step (4), the IP network contents and service provider 400 transmits the control signal to the mobile communication network-IP network gateway device 10 through the IP network 200 by the original protocol on HTTP.

In Step (5), the information processing unit 11 of the mobile communication network-IP network gateway device 10 judges that the signal type is the control signal by the judgment of the gateway rules, and converts the original protocol on HTTP for the IP network 200 into the original protocol A of the side of the mobile communication network 100.

In Step (6), the information processing unit 11 of the mobile communication network-IP network gateway device 10 employs the original protocol A converted in Step (5) to transmit the control signal to the communication terminal or the predetermined communication device in the mobile communication network 100 which is the destination.

CONVERSION EXAMPLE 2

Figure 17:
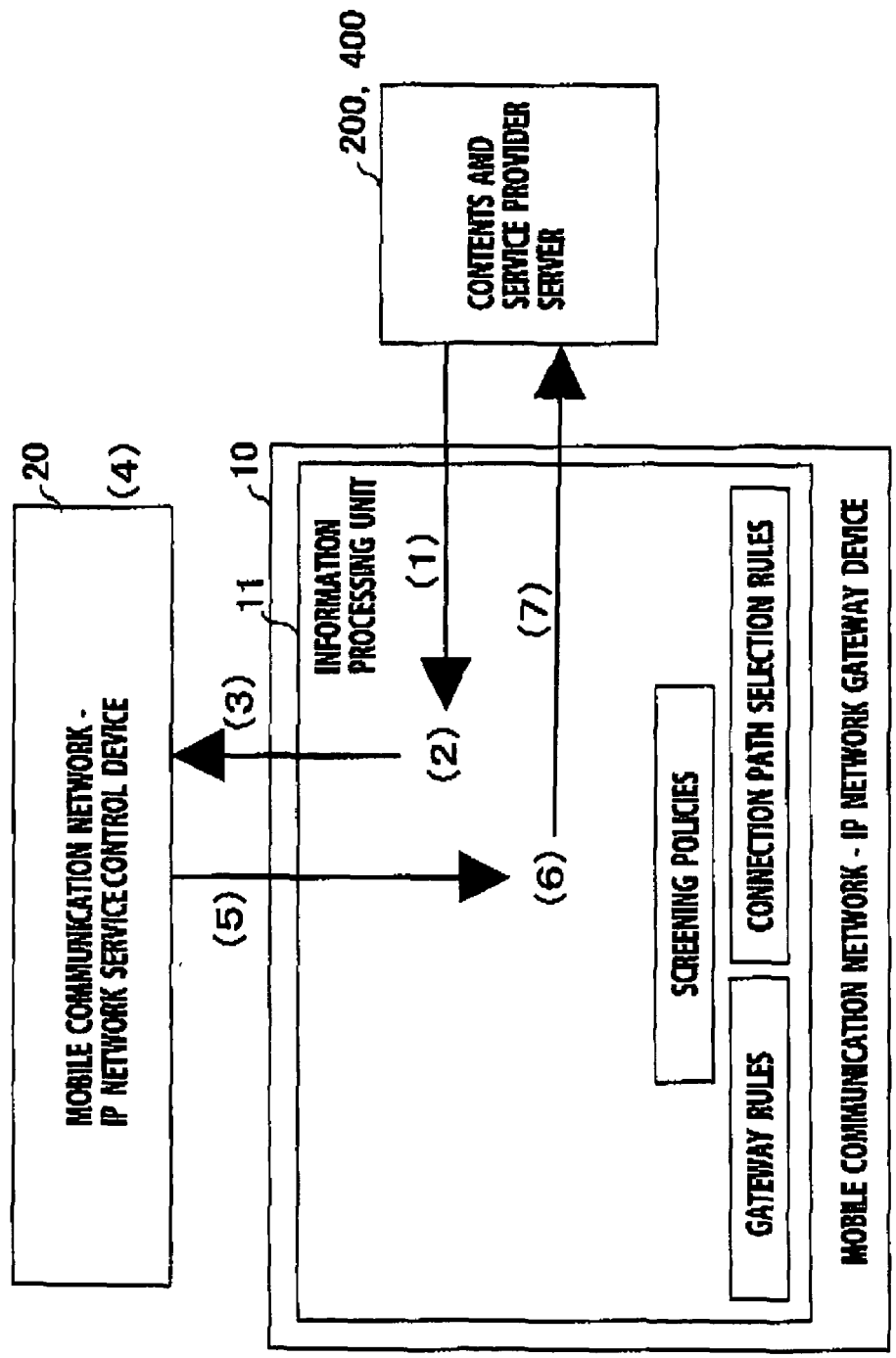
FIG. 17 is an explanatory view showing functions of a protocol conversion example 2 of the mobile communication network-IP network gateway device in the service providing system according to the first embodiment of the present invention.

Conversion Example 2 shown in FIG. 17 shows the conversion process between an original protocol B as a location information protocol used in the mobile communication network-IP network service control device 20 and an original protocol defined on HTTP on the side of the IP network 200.

In order to utilize the mobile communication network function from the IP contents and service provider 400, between the mobile communication network-IP network gateway device 10 and the IP network 200, the original protocol defined on HTTP is utilized, and the protocol conversion is performed in the mobile communication network-IP network gateway device 10. Thus, the location information service of the mobile communication network-IP network service control device 20 can be utilized from the IP network contents and service provider 400. The process operation of this case can be used as described below.

As shown in FIG. 17, in Step (1), the original header and the original method for acquiring location information defined in the original protocol on HTTP are used to transmit a location information requesting signal to the mobile communication network-IP network gateway device 10, from the IP network 200.

In Step (2), the information processing unit 11 of the mobile communication network-IP network gateway device 10, which has received the location information requesting signal, judges that the service request type is the location information requesting signal by the judgment of the gateway rules, and converts the service request from the original protocol on HTTP to the original protocol B of the mobile communication network-IP network service control device 20.

In Step (3), the information processing unit 11 of the mobile communication network-IP network gateway device 10 employs the converted original protocol B to transfer the location information requesting signal to the mobile communication network-IP network service control device 20.

In Step (4), upon receipt of the location information requesting signal of the original protocol B, the mobile communication network-IP network service control device 20 executes a predetermined location information service process.

In Step (5), the mobile communication network-IP network service control device 20 transmits the service process results to the mobile communication network-IP network gateway device 10 by the original protocol B.

In Step (6), the mobile communication network-IP network gateway device 10 converts the original protocol B into the original protocol on HTTP.

In Step (4), the mobile communication network-IP network gateway device 10 transmits the service process results for the location information request to the IP network contents and service provider 400 which is the service request source, by employing the original protocol on HTTP.

CONVERSION EXAMPLE 3

Figure 18:
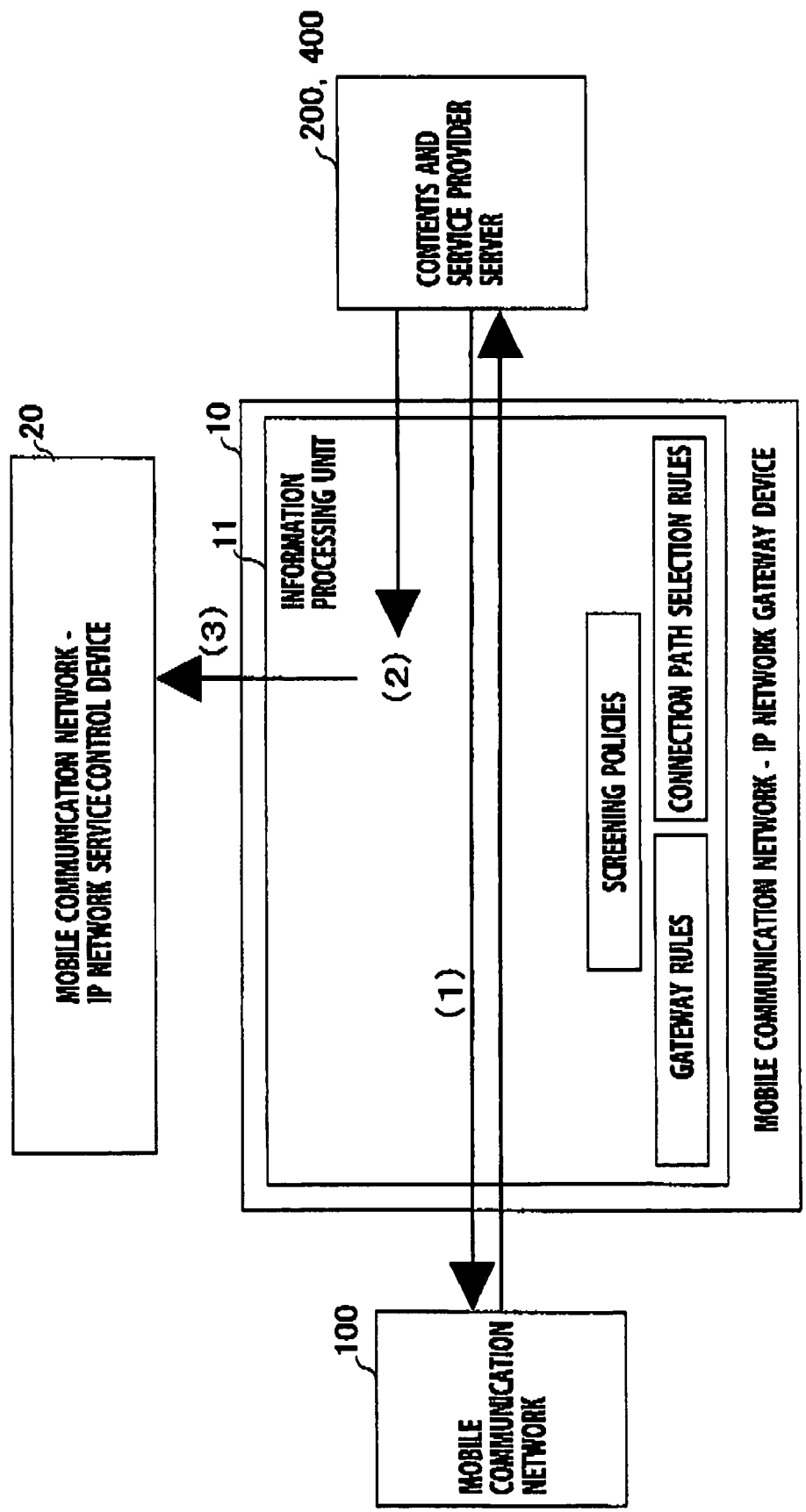
FIG. 18 is an explanatory view showing functions of a protocol conversion example 3 of the mobile communication network-IP network gateway device in the service providing system according to the first embodiment of the present invention.

In Conversion Example 3 shown in FIG. 18, the mobile communication network-IP network service control device 20 employs an original protocol C as a charging information protocol. Contents and service are transmitted and received to and from the mobile communication network 100 and the IP network 200 by employing HTTP.

Thereupon, the mobile communication network-IP network gateway device 10 monitors the transmission and receipt of the contents and services to and from the IP network 200 and the mobile communication network 100, generates charging information in accordance with the amount of IP packets transferred by the mobile communication network-IP network gateway device 10, and utilizes the original protocol C to transmit the charging information to the mobile communication network-IP network service control device 20. FIG. 18 shows the protocol conversion process operation of this case.

As shown in FIG. 18, in Step (1), the contents and the services are transmitted and received to and from the mobile communication network 100 and the IP network 200 by employing HTTP.

In Step (2), the mobile communication network-IP network gateway device 10 monitors the amount of IP packets transferred between the mobile communication network 100 and the IP network 200, and generates the charging information in accordance with the amount of transmitted and received IP packets.

In Step (3), the mobile communication network-IP network gateway device 10 transmits the charging information to the mobile communication network-IP network service control device 20 by employing the original protocol C.

CONVERSION EXAMPLE 4

Figure 19:
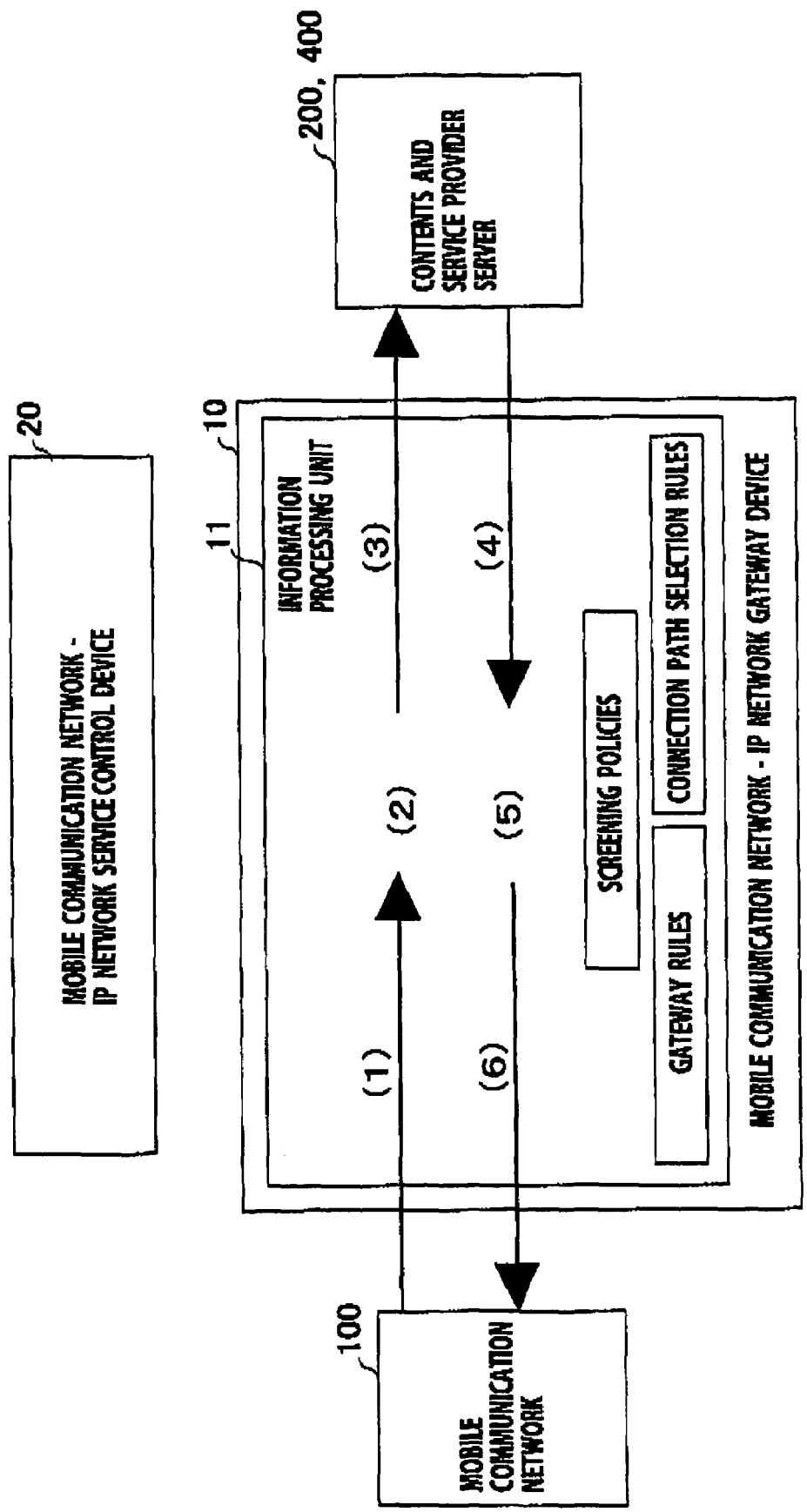
FIG. 19 is an explanatory view showing functions of a protocol conversion example 4 of the mobile communication network-IP network gateway device in the service providing system according to the first embodiment of the present invention.

In Conversion Example 4 shown in FIG. 19, the mobile communication network 100 employs an original protocol (an original header or an original method) defined on HTTP as a protocol for sending and receiving mails. In addition, another original protocol defined on HTTP as a protocol for sending and receiving mails is used between the mobile communication network-IP network gateway device 10 and the IP network 200.

Thus, upon sending and receiving mails to and from the mobile communication network 100 and the IP network 200, it is necessary to perform conversions (original method/header conversion) between the original protocols on HTTP in the mobile communication network-IP network gateway device 10. When the Push service such as sending mails is performed, the mobile communication network-IP network gateway device 10 performs the protocol conversion process as shown in FIG. 19.

As shown in FIG. 19, in Step (1), the mobile communication network-IP network gateway device 10 receives a mail acquisition requesting signal from the mobile communication network 100.

In Step (2), the mobile communication network-IP network gateway device 10 performs a judging process by the gateway rules for the mail acquisition requesting signal received from the mobile communication network 10, and judges that the signal is the mail acquisition requesting signal. Since the mail acquisition requesting signal is transmitted by employing HTTP in communication, the mobile communication network-IP network gateway device 10 relays the mail acquisition requesting signal to the IP network 200 without performing particular processes.

In Step (3), the mobile communication network-IP network gateway device 10 employs a normal HTTP to transmit the mail acquisition requesting signal to the IP network 200.

In Step (3), when retaining mails for the mobile communication terminal 300 on the mobile communication network 100, which has been transmitting the mail acquisition requesting signal, the IP network contents and service provider 400 on the IP network 200, which acquired the mail acquisition requesting signal, employs the original protocol on HTTP to respond the mail acquisition requesting signal.

In Step (5), the mobile communication network-IP network gateway device 10 performs the judging process for the signal received from the IP network 200 by the gateway rules, and judges that the signal is a mail acquisition responding signal. Thereafter, the mobile communication network-IP network gateway device 10 executes the conversion shown in FIG. 11 regarding the original header included in the mail acquisition responding signal.

In Step (6), the mobile communication network-IP network gateway device 10 employs the original protocol on HTTP to transfer the mail acquisition responding signal to the mobile communication terminal 300 which id the source of the mail acquisition requesting signal.

Second Embodiment

Referring to FIGS. 21 to 25, a second embodiment of the present invention is described. Hereinafter, differences between the present embodiment and the aforementioned first embodiment are mainly described.

Figure 21:
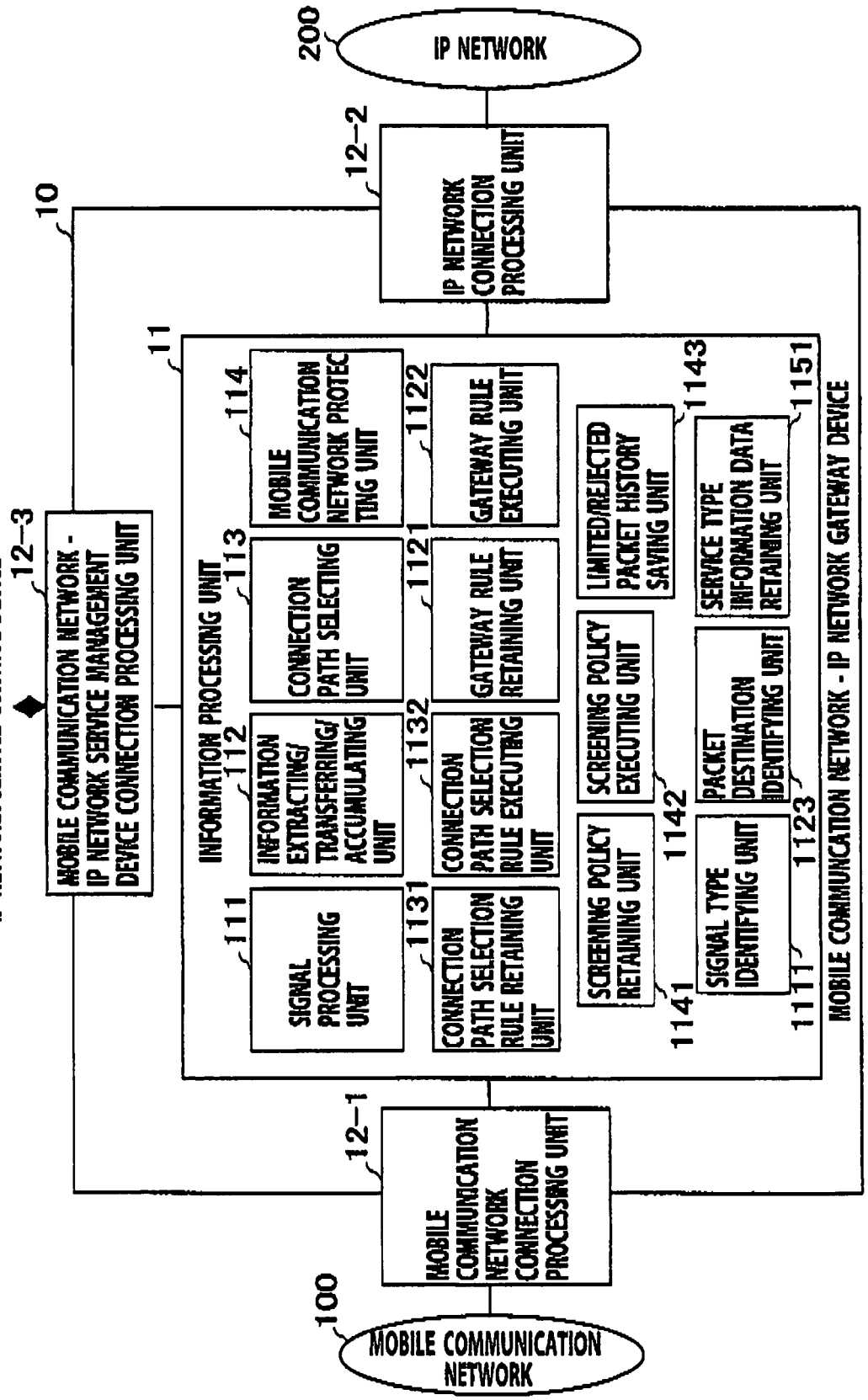
FIG. 21 is a block diagram showing the function configuration of a mobile communication network-IP network gateway device in a service providing system according to a second embodiment of the present invention.

As shown in FIG. 21, an information processing unit 11 of a mobile communication network-IP network gateway device 10 according to the present embodiment includes a service type information data retaining unit 1151 in addition to the configuration of the information processing unit 11 of the mobile communication network-IP network gateway device 10 according to the first embodiment shown in FIG. 2.

The service type information data retaining unit 1151 is configured to store and retain service type information data transmitted from a mobile communication network-IP network service control device 20. The service type information data retaining unit 1151 retains the plurality of service type information data corresponding to the service types.

Herein, the service type information data includes "rules relating to protocol conversion (protocol conversion information)" and "information on a signal process sequence", which are performed on a signal when the signal corresponding to a predetermined service type is transmitted from a communication terminal or a predetermined communication device of a mobile communication network 100 or an IP network 200.

As a result, the mobile communication network-IP network gateway device 10 according to the present embodiment can execute protocol conversion and a signal process sequence for responding the plurality of types of service requests in the signal processing unit 111.

For example, the service type information data retaining unit 1151 retains the service type information data for the Push service, so that the mobile communication network-IP network gateway device 10 can perform protocol conversion suitable for the Push service, for instance, original header conversion, as shown in FIG. 15. In addition, the mobile communication network-IP network gateway device 10 can execute the signal process sequence suitable for the Push service as shown in FIG. 11.

As described above, by retaining the service type information data for various services in the service type information data retaining unit 1151, the mobile communication network-IP network gateway device 10 can execute the protocol conversion and the signal process sequence suitable for the various services.

Figure 22:
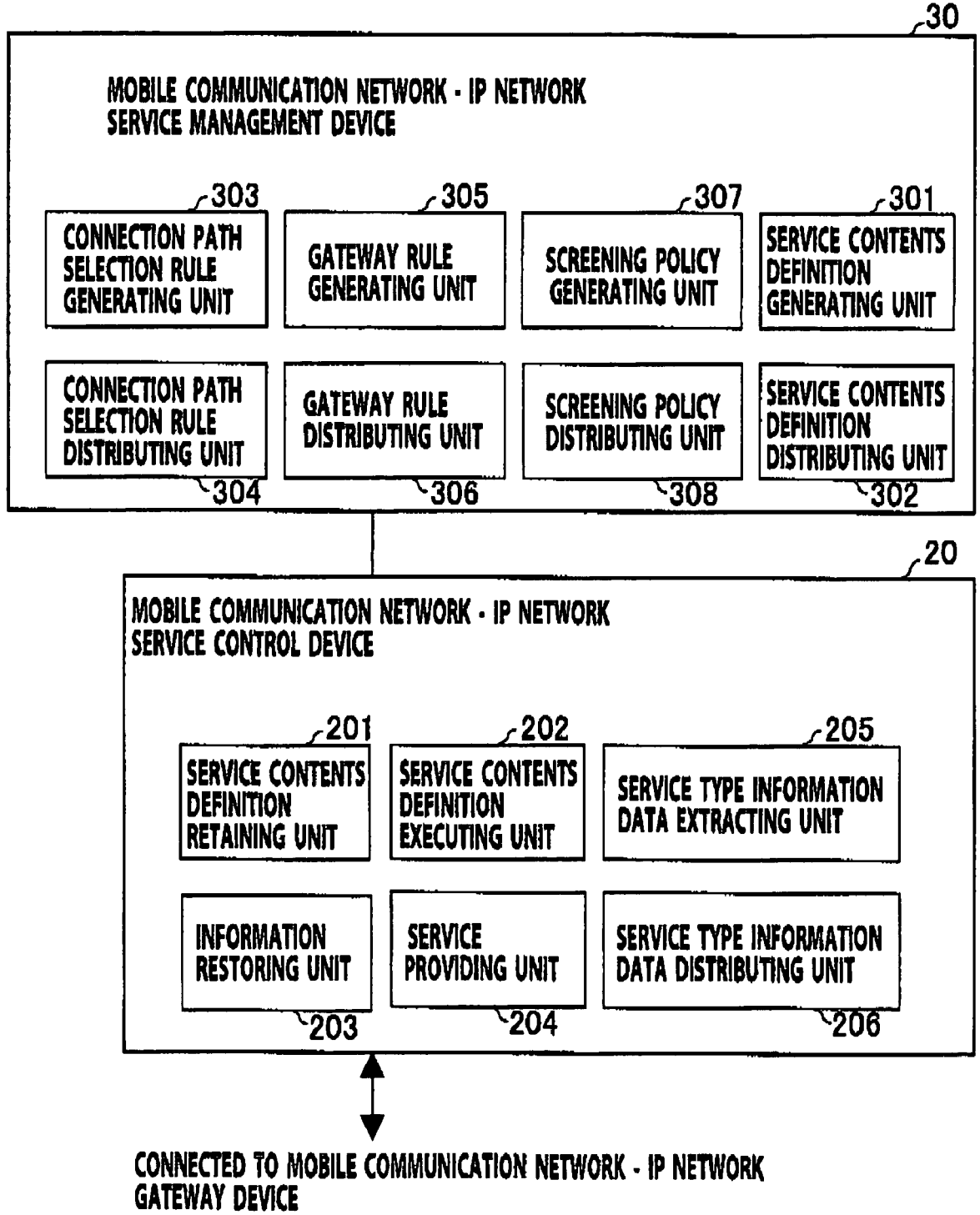
FIG. 22 is a block diagram showing the function configurations of a mobile communication network-IP network service control device and a mobile communication network-IP network service management device in the service providing system according to the second embodiment of the present invention.

As shown in FIG. 22, the mobile communication network-IP network service control device 20 according to the present embodiment includes a service type information data extracting unit 205 and a service type information data distributing unit 206, in addition to the configuration of the mobile communication network-IP network service control device 20 according to the first embodiment shown in FIG. 3.

The mobile communication network-IP network service control device 20 retains service contents definitions distributed from a mobile communication network-IP network service management device 30 in the service contents definition retaining unit 201. Note that service process contents for a signal (IP packet) transmitted from the mobile communication network-IP network gateway device 10 are described in the service contents definitions.

In other words, the mobile communication network-IP network service control device 20 judges a service type requested by the signal transmitted from the mobile communication network-IP network gateway device 10, retrieves the service contents definitions for the service type thereof, and executes a service process (service control) for the signal.

Herein, upon receipt of the service contents definitions from the mobile communication network-IP network service management device 30, the service type information data extracting unit 205 of the mobile communication-IP network service control device 20 extracts signal process contents that should be processed in the mobile communication network-IP network gateway device 10 for the service type, and generates the service type information data. The service type information data distributing unit 206 distributes the generated service type information data to the mobile communication network-IP network gateway device 10.

Figure 23:
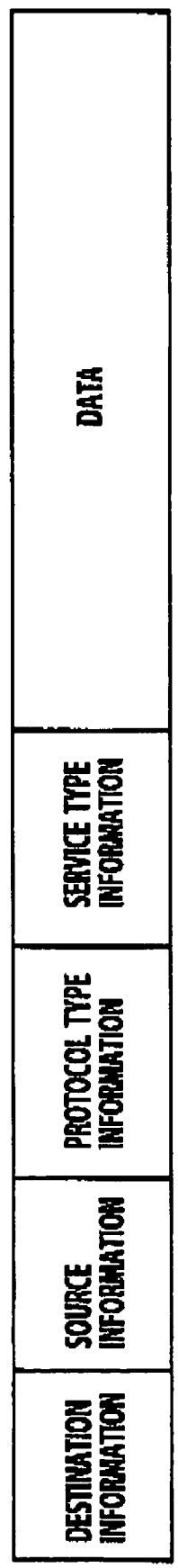
FIG. 23 is a view showing an example of a format of a signal sent to the mobile communication network-IP network gateway device in the service providing system according to the second embodiment of the present invention.

FIG. 23 shows a format of a signal transmitted from the communication terminal or the predetermined communication device of the mobile communication network 100 or the IP network 200 to the mobile communication network-IP network gateway device 10. This signal includes "destination information of the signal (destination information)", "source information of the signal", "protocol type information" and "service type information".

Herein, by extracting the "destination information" from the received signal as well as selecting and executing connection path selection rules, which should be applied to the "destination information", among the connection path selection rules retained in the mobile communication network-IP network gateway device 10, the mobile communication network-IP network gateway device 10 can select a connection path appropriate for the signal.

In addition, by selecting and executing screening policies, which should be applied to the signal, based on the "destination information", "source information" and "service type information" extracted from the received signal in the signal processing unit 111, the mobile communication network-IP network gateway device 10 can execute a security process appropriate for the signal.

Moreover, by extracting the "service type information" from the received signal as well as selecting and executing the service type information data that should be applied to the service type corresponding to the "service type information" among the service type information data retained in the mobile communication network-IP network gateway device, the mobile communication network-IP network gateway device 10 can perform a protocol conversion process and a signal process sequence, which are appropriate for the requested service type.

Furthermore, the mobile communication network-IP network gateway device 10 transmits the aforementioned processed signal to the destination designated by the signal in the "destination information", or transmits the signal to the destination predetermined by the service type designated in the "service type information".

Herein, the mobile communication network-IP network service control device 20, or the communication terminal or the predetermined communication device of the mobile communication network 100 or the IP network 200 receives the signal appropriately processed in advance by the mobile communication network-IP network gateway device 10, thereby reduction of the process load can be achieved.

As described above, the mobile communication network-IP network gateway device 10 can execute appropriate protocol conversion and the signal process sequence in accordance with the service type.

In addition, the mobile communication network-IP network gateway device 10 transmits the aforementioned processed signal to the mobile communication network-IP network service control device 20 or the mobile communication terminal or the predetermined communication device of the mobile communication network 100 or the IP network 200 while embedding the service type information requested by the signal in the processed signal. As a result, the mobile communication network-IP network service control device 20, which has received the signal, can judge the service type that should be executed by the device as well as select and execute the appropriate one among the service contents definitions retained by the device for the signal. Furthermore, the communication terminal or the predetermined communication device of the mobile communication network 100 or the IP network 200, which has received the signal, can easily judge the process that should be performed by the communication terminal or the predetermined communication device for the signal.

Referring to FIG. 24, the operation of a service providing system according to the present embodiment is described.

As shown in FIG. 24, in Step (1), the communication terminal or the predetermined communication device of the mobile communication network 100 or the IP network 200 designates the mobile communication network-IP network service control device 20 as the "destination information", and transmits the signal requesting a service type ,, to the mobile communication network-IP network gateway device 10.

In Step (2), the signal processing unit 111 of the mobile communication network-IP network gateway device 10, which has received the signal, extracts the "service type information" included in the signal, and inquires the service type information data retaining unit 1151 whether or not the device retains the service type information data corresponding to the "service type information." The service type information data retaining unit 1151 retrieves and returns the service type information data ,, to the signal processing unit 111.

In Step (3), the signal processing unit 111, which has received the service type information data ,,, executes the predetermined signal process sequence and protocol conversion in accordance with the contents described in the service type information data ,,.

In Step (4), the signal processing unit 111 transmits the signal, on which the predetermined process is performed, to the mobile communication network-IP network service control device 20 in accordance with the "destination information" included in the signal.

In Step (5), a service contents definition executing unit 202 of the mobile communication network-IP network service control device 20, which has received the signal, judges the service type requested by the signal, and inquires a service contents definition retaining unit 201 whether or not the device contains the corresponding service contents definitions. The service contents definition retaining unit 201 retrieves and returns the corresponding service contents definition ,, to the service contents definition executing unit 202.

In Step (6), the service contents definition executing unit 202, which has received the service contents definition ,, executes a predetermined service process in accordance with the contents described in the service contents definition ,,.

In Step (7), the service contents definition executing unit 202 returns the signal, on which the predetermined service process has been performed, to the mobile communication network-IP network gateway device 10.

In Step (8), the mobile communication network-IP network gateway device 10 returns the signal, on which the service process has been performed, transmitted from the mobile communication network-IP network service control device 20 to the communication terminal or the predetermined communication device of the mobile communication network 100 or the IP network 200 which is the source.

Instead of integrally determining all the directions of transferring the signal received from the communication terminal or the predetermined communication device of the mobile communication network 100 or the IP network 200, the mobile communication network-IP network gateway device 10 according to the present embodiment may be configured to determine the directions in accordance with the information described in the "service type information data". As a result, in the mobile communication network-IP network gateway device 10 according to the present embodiment, a direction of transferring a signal is distinguished in accordance with the service type.

For example, when the communication terminal or the predetermined communication device of the mobile communication network 100 designates the "self information register" as the service type information and transmits the signal in order to register the information on the communication terminal or the predetermined communication device with the mobile communication network-IP network service control device 20, the mobile communication network-IP network gateway device 10, which has received the signal, refers the service type information data corresponding to the service type information, detects that the destination of the signal is the mobile communication network-IP network service control device 20, and performs the predetermined signal process. Thereafter, the mobile communication network-IP network gateway device 10 transmits the signal to the mobile communication network-IP network service control device 20.

Moreover, for example, as shown in FIG. 17, when the communication terminal or the predetermined communication device of the IP network 200 designates the service type for acquiring location information on a communication device in the mobile communication network 100 and transmits the signal, the mobile communication network-IP network gateway device 10, which has received the signal, refers to the service type information data corresponding to the service type information, detects that the destination of the signal is the mobile communication network-IP network service control device 20, and performs the predetermined signal process. Thereafter, the mobile communication network-IP network gateway device 10 transmits the signal to the mobile communication network-IP network service control device 20.

In addition, for example, as shown in FIG. 16, when the communication terminal or the predetermined communication device of the mobile communication network 100 transmits the signal for HTTP access to the IP network 200, the mobile communication network-IP network gateway device 10, which has received the signal, refers to the service type information data corresponding to the service type information, detects that the destination of the signal is the IP network 200, and performs the predetermined signal process. Thereafter, the mobile communication network-IP network gateway device 10 transmits the signal to the IP network 200. At this time, the "destination information" designated in advance by the signal transmitted from the communication terminal or the predetermined communication device of the mobile communication network 100 is used as the information for designating the final access destination (HTTP server in the IP network 200 or the like).

Furthermore, as shown in FIG. 18, when the communication is performed between the communication terminal or the like of the mobile communication network 100 and the communication terminal or the like of the IP network 200 through the mobile communication network-IP network gateway device 10, the mobile communication network-IP network gateway device 10 can be configured to automatically collect information on the amount of packets dealt for the communication, and judge the destination of the information on the amount of packets in accordance with the described contents of the service type information data on a charging process, which are retained by the device.

As described above, since the judgment for distinguishing directions of transferring the signal is performed in accordance with the information described in the service type information data retained in the device, the mobile communication network-IP network gateway device 10 according to the present embodiment can change the judging conditions of the directions of transferring the signal easily by changing or updating the service type information data properly.

When transmitting (transferring) the signal, the mobile communication network-IP network gateway device 10 executes different protocol conversion occasionally depending on the destination of the signal. This case is described with reference to FIG. 25.

In an example of FIG. 25, an Internet 200-1 and a dedicated line 200-2 are connected to the mobile communication network-IP network gateway device 10, and HTTP servers X and Y are connected to the Internet 200-1 and the dedicated line 200-2, respectively. The mobile communication network-IP network gateway device 10 receives a signal requesting an access to an HTTP server from the communication terminal in the mobile communication network 100.

In Step (1), the communication terminal in the mobile communication network 100 designates the HTTP access as "service type information", designates the HTTP server Y connected to the mobile communication network-IP network gateway device 10 through the dedicated line 200-2 as the "destination information," and transmits a signal to the mobile communication network-IP network gateway device 10.

In Step (2), the mobile communication network-IP network gateway device 10, which has received the signal, detects the service type requested by the received signal, and retrieves the service type information data retained in the device.

In Step (3), the mobile communication network-IP network gateway device 10 performs the predetermined signal process for the signal in accordance with the information described in the retrieved service type information data.

In Step (4), in order to detect the destination information included in the received signal and transmit the signal to the destination designated in the destination information, the mobile communication network-IP network gateway device 10 refers the connection path selection rules retained in the device and judges the connection path to the HTTP server Y.

In Step (5), the mobile communication network-IP network gateway device 10 transmits the signal to an IP network connection processing unit 12-2 based on the judged connection path to the HTTP server Y.

In Step (6), the IP network connection processing unit 12-2, which has received the signal for the HTTP server T, recognizes that the HTTP server Y is connected through the dedicated line 200-2, and executes media conversion and protocol conversion suitable for the dedicated line 200-2.

In Step (7), after executing the predetermined media conversion and protocol conversion, the IP network connection processing unit 12-2 transfers the signal to the HTTP server Y.

Note that, in Step (6), when the HTTP server X is designated as the destination, the IP network connection processing unit 12-2 executes the media conversion and the protocol conversion suitable for the Internet 200-1.

As described above, the mobile communication network-IP network gateway device 10 according to the present embodiment can change the protocol conversion and media conversion, which are executed in accordance with the "service type information" and the "destination information" included in the received signal, by the service type information data and the connection path selection rules dynamically.

Moreover, by being provided with a mobile communication network connection processing unit 12-1 and the IP network connection processing unit 12-2, the mobile communication network-IP network gateway device 10 according to the present embodiment can execute the processes including the media conversion and the protocol conversion which are not directly concerned with the service process, independently of the service process.

As a result, according to the mobile communication network-IP network gateway device 10 in accordance with the present embodiment, it is possible to freely change the network connected to the mobile communication network-IP network gateway device 10 without making any changes to the service contents definitions retained by the mobile communication network-IP network service control device 20 and the mobile communication network-IP network service management device 30 and the signal processing unit 111 of the mobile communication network-IP network gateway device 10.

INDUSTRIAL APPLICABILITY

As described above, according to the present invention, it is possible to change gateway functions suitably by function change commands given through the service control device.

In addition, according to the present invention, it is possible to process information required for the service control device suitably in accordance with the service type.

Moreover, according to the present invention, it is possible to perform protocol conversion in accordance with a service type in an application layer suitably for various services, and provide the various services by simply changing or adding an application.

Furthermore, according to the present invention, dedicated interfaces for the various services are provided between the service control device and the networks, signal transfer and protocol conversion/inverse conversion are performed by the corresponding interfaces of the gateway device, and the signal is given to the service control device. Thus, it is possible to provide the service control device with basic functions for dedicating to process high-value-added services.

Further, according to the present invention, by making the contents and service provider of the external network utilize the network interfaces prepared in the gateway device, it is possible to provide a platform which makes the mobile communication network function usable as the functions in the external network.

The invention claimed is:

1. A gateway device connected to a mobile communication network, an external network, and a service control device which executes service control based on packet signals received from a communication terminal or a predetermined communication device, so as to transmit and receive packet signals to and from the service control device, the gateway device comprising:

a receiver configured to receive control information, required for providing a plurality of services, from the service control device, the control information generated by a service management device connected to the service control device and including rules or policies defined for each of the plurality of services; and an information processor configured to perform a predetermined information process for a packet signal received from the mobile communication network or the external network based on the control information, wherein each rule or policy included in the control information specifies processing for the packet signal, wherein the information processor comprises a gateway rule retainer and a gateway rule executor, the gateway rule retainer is configured to retain a gateway rule given through the service control device, and the gateway rule executor is configured to execute a gateway process by applying the gateway rule to packet signals, which are received from the service control device, the mobile communication network, the external network, and the communication terminal or the predetermined communication device contained in the mobile communication network or the external network, the gateway rule comprising at least one of protocol conversion information on protocol conversions which should be executed in the gateway device when packet signals are transferred among the service control device, the mobile communication network, and the external network;

information extraction information on information which should be acquired in the gateway device from the packet signals transmitted from the service control device, the mobile communication device, or the external network;

packet allocation information on packet allocation performed in the gateway device to a connection processor containing a network and the communication terminal or the communication device for the packet signals transmitted from the service control device, the mobile communication network, or the external network; and information accumulation information on a packet signal which should be accumulated in the gateway device among the packet signals transmitted from the service control device, the mobile communication network, or the external network, and the gateway rule executor is configured to execute a protocol conversion process in accordance with the protocol conversion information defined by the gateway rule, an information extraction process in accordance with the information extraction information, a packet allocation process to the connection processor in accordance with the packet allocation information, or an accumulation process of the packet signals in accordance with the information accumulation information, for the packet signals received from the service control device, the mobile communication network, the external network, or the communication terminal or the predetermined communication device contained in the mobile communication network or the external network.

2. A gateway device connected to a mobile communication network, an external network, and a service control device which executes service control based on packet signals received from a communication terminal or a predetermined communication device, so as to transmit and receive packet signals to and from the service control device, the gateway device comprising:

a receiver configured to receive control information, required for providing a plurality of services, from the service control device, the control information generated by a service management device connected to the service control device and including rules or policies defined for each of the plurality of services; and an information processor configured to perform a predetermined information process for a packet signal received from the mobile communication network or the external network based on the control information, wherein each rule or policy included in the control information specifies processing for the packet signal, wherein the information processor comprises a connection path selection rule retainer and a connection path selection rule executor, the connection path selection rule retainer is configured to retain a connection path selection rule given through the service control device, and the connection path selection rule executor is configured to apply the connection path selection rule to the packet signal received from the mobile communication network, the external network, or the service control device, so as to determine a destination of the packet signal and to transfer the packet signal to the destination, the connection path selection rule comprising at least one of:

service type information on service prepared by the service control device or a contents and service provider in the external network;

source information of the packet signals of a service control device, a mobile communication network, an external network, or a communication terminal or a predetermined communication device contained in the mobile communication network or the external network, which are expected in advance to transmit the packet signals;

destination information of the packet signals which are expected in advance to designate as the destination of the packet signals by the network or the device, and the connection path selection rule executor is configured to identify the source information, the destination information, and the service type information of the packet signals, to judge the destination of the packet signals by applying the information described on the connection path selection rule, and to transfer the packet signals to the corresponding destination, when receiving the packet signals transmitted from the service control device, the mobile communication network, the external network, or the communication terminal or the predetermined communication device contained in the mobile communication network or the external network.

3. A gateway device connected to a mobile communication network, an external network, and a service control device which executes service control based on packet signals received from a communication terminal or a predetermined communication device, so as to transmit and receive packet signals to and from the service control device, the gateway device comprising:

a receiver configured to receive control information, required for providing a plurality of services, from the service control device, the control information generated by a service management device connected to the service control device and including rules or policies defined for each of the plurality of services; and an information processor configured to perform a predetermined information process for a packet signal received from the mobile communication network or the external network based on the control information, wherein each rule or policy included in the control information specifies processing for the packet signal, wherein the information processor comprises a screening policy retainer and a screening policy executor, the screening policy retainer is configured to retain a screening policy sent through the service control device, and the screening policy executor is configured to apply the screening policy to the packet signals received from the mobile communication network, the external network, or the communication terminal or the predetermined communication device contained in the mobile communication network or the external network, so as to judge the correctness of the packet signals and to discard an inappropriate packet signal, the screening policy comprising at least one of:

information indicating a protocol type which allows transfer of the packet signals, a port number, and a direction of packet signals flow, in the gateway device;

information for judging the correctness of an original protocol defined to mutually connect the service control device, the mobile communication network, and the external network; and information indicating a limit of packet process capabilities of the service control device and the gateway device, and the screening policy executor is configured to execute a process for judging the protocol type and the port number of the packet signal and the direction of the packet signals flow and for additionally judging the correctness of the original protocol when the packet signal is transmitted on the original protocol; a process for transferring packet signals, which are allowed to be transferred by the screening policy, in the gateway device and for discarding packet signals, which are not allowed to be transferred, in the gateway device, or a process for discarding the packet signal in the gateway device to avoid congestion when the packet signals more than the limit of the process capabilities of the service control device or the gateway device defined by the screening policy are transmitted, when receiving the packet signals transmitted from the mobile communication network, the external network, or the communication terminal or the predetermined communication device contained in the mobile communication network or the external network.

4. A gateway device connected to a mobile communication network, an external network, and a service control device which executes service control based on packet signals received from a communication terminal or a predetermined communication device, so as to transmit and receive packet signals to and from the service control device, the gateway device comprising:

a receiver configured to receive control information, required for providing a plurality of services, from the service control device, the control information generated by a service management device connected to the service control device and including rules or policies defined for each of the plurality of services;

an information processor configured to perform a predetermined information process for a packet signal received from the mobile communication network or the external network based on the control information, wherein each rule or policy included in the control information specifies processing for the packet signal;

a signal converter configured to convert the packet signal, a destination of the packet signal being determined in the gateway device to be the service control device, among packet signals from the mobile communication network, the external network, or the communication terminal or the predetermined communication device contained in the mobile communication network or the external network, from an original protocol into a protocol associated with a service type executed in the service control device, so as to transmit the packet signal to the service control device, to receive control information and service process results processed in the service control device, and to perform inverse conversion of the packet signal conversion, the service type including a service providing location information; and a signal exchanger configured to exchange packet signals between the signal converter and the mobile communication network or the external network containing the communication terminal or the predetermined communication device, wherein the signal exchanger is configured to define individual service control device interfaces for each of the service types for the service control device, to transfer the packet signal converted in the signal converter to the service control device through a corresponding service control device interface among the service control device interfaces, to perform, in the signal converter, the inverse conversion on the packet signal received from the service control device through one of the service control device interfaces, and to transmit the packet signal to a network, a communication terminal, or a communication device of a service request source.

5. The gateway device according to claim 4, wherein the signal exchanger comprises a service type identifier, and the service type identifier is configured to define individual network interfaces for each of the service types which the service control device can provide, to receive a service request signal from the mobile communication network, the external network, the communication terminal or the predetermined communication device contained in the mobile communication network or the external network, to exchange the service request signal to the signal converter through the network interfaces corresponding to the service types, and to transmit a received packet signal, on which the inverse conversion is performed in the signal converter, to the network, the communication terminal or the communication device of the service request source through one of the interfaces.

* * * * *